(12) United States Patent
Jouhara

(10) Patent No.: US 11,598,550 B2
(45) Date of Patent: Mar. 7, 2023

(54) HEAT PIPE THERMAL TRANSFER LOOP WITH PUMPED RETURN CONDUIT

(71) Applicant: BRUNEL UNIVERSITY LONDON, Uxbridge (GB)

(72) Inventor: Hussam Jouhara, Uxbridge (GB)

(73) Assignee: Brunel University London, Uxbridge (GB)

( * ) Notice: Subject to any disclaimer, the term of this patent is extended or adjusted under 35 U.S.C. 154(b) by 0 days.

(21) Appl. No.: 16/952,474

(22) Filed: Nov. 19, 2020

(65) Prior Publication Data
US 2021/0071900 A1 Mar. 11, 2021

Related U.S. Application Data

(63) Continuation of application No. PCT/GB2019/051557, filed on Jun. 5, 2019.

(30) Foreign Application Priority Data

Jun. 5, 2018 (GB) ...................................... 1809208

(51) Int. Cl.
*F28D 15/00* (2006.01)
*F24F 12/00* (2006.01)
*F28D 15/02* (2006.01)

(52) U.S. Cl.
CPC .......... *F24F 12/002* (2013.01); *F28D 15/025* (2013.01); *F28D 15/0266* (2013.01); *F24F 2012/005* (2013.01)

(58) Field of Classification Search
CPC ...... F24F 12/002; F24F 2012/005; F24F 7/08; F28D 15/025; F28D 15/0266; F28D 15/06; F28D 2015/0216; F28D 2015/0291
See application file for complete search history.

(56) References Cited

U.S. PATENT DOCUMENTS

| | | | | |
|---|---|---|---|---|
| 4,142,575 A | * | 3/1979 | Glancy | F24F 12/002 165/66 |
| 4,200,147 A | * | 4/1980 | Hedbom | F24F 12/002 165/104.31 |

(Continued)

FOREIGN PATENT DOCUMENTS

| | | |
|---|---|---|
| CN | 102 721 309 B | 6/2016 |
| GB | 1028179 A | 5/1966 |

(Continued)

OTHER PUBLICATIONS

International Search Report and Written Opinion dated Oct. 8, 2019 in connection with PCT/GB2019/051557.

*Primary Examiner* — Travis Ruby
(74) *Attorney, Agent, or Firm* — Cook Alex Ltd.

(57) ABSTRACT

A heat pipe system including a heat pipe having a first end and a second end for transferring working fluid from the first to the second end, a first reservoir in fluid communication with the first end for holding working fluid in liquid form, a first heat exchanger for transmitting thermal energy from a heat source to working fluid in the first reservoir to vaporize the fluid, a second heat exchanger for transmitting thermal energy from vaporized working fluid to a heat sink thereby condensing the fluid, a return conduit and a pump for pumping the condensed working fluid along the return conduit, where the heat pipe, the return conduit and the first reservoir form a hermetically sealed circuit. A method of transferring thermal energy using a heat pipe system is also disclosed.

10 Claims, 25 Drawing Sheets

(56) References Cited

U.S. PATENT DOCUMENTS

| | | | | |
|---|---|---|---|---|
| 4,252,185 | A * | 2/1981 | Kosson | F28D 21/0003 |
| | | | | 165/104.25 |
| 4,476,922 | A * | 10/1984 | Heilig, Jr. | F24F 12/002 |
| | | | | 165/104.25 |
| 4,745,965 | A * | 5/1988 | Katsura | F28D 15/025 |
| | | | | 122/366 |
| 5,333,677 | A * | 8/1994 | Molivadas | F24S 10/504 |
| | | | | 165/272 |
| 5,441,102 | A * | 8/1995 | Burward-Hoy | F28D 1/0325 |
| | | | | 165/104.22 |
| 5,884,693 | A * | 3/1999 | Austin | A61B 8/546 |
| | | | | 165/104.33 |
| 5,911,272 | A * | 6/1999 | Cornog | F28D 15/0266 |
| | | | | 165/104.25 |
| 6,948,556 | B1 | 9/2005 | Anderson et al. | |
| 8,033,322 | B1 * | 10/2011 | Trent | F24F 12/002 |
| | | | | 165/54 |
| 10,436,519 | B1 * | 10/2019 | Longtin | F28D 15/025 |
| 2005/0205239 | A1 * | 9/2005 | Take | F28D 15/0266 |
| | | | | 165/80.3 |
| 2006/0191667 | A1 * | 8/2006 | Chen | H05K 7/20272 |
| | | | | 165/80.4 |
| 2007/0119572 | A1 * | 5/2007 | Weber | H01L 23/4735 |
| | | | | 165/80.4 |
| 2007/0209782 | A1 * | 9/2007 | Wyatt | F28D 15/0266 |
| | | | | 165/76 |
| 2009/0242174 | A1 * | 10/2009 | McCutchen | F28D 15/025 |
| | | | | 165/104.25 |
| 2011/0088872 | A1 * | 4/2011 | Chang | F28D 15/043 |
| | | | | 165/104.25 |
| 2011/0259573 | A1 * | 10/2011 | Ezawa | F24F 12/002 |
| | | | | 165/253 |
| 2012/0186787 | A1 * | 7/2012 | Dinh | F28D 15/06 |
| | | | | 165/104.26 |
| 2014/0174701 | A1 * | 6/2014 | Kare | F28D 15/043 |
| | | | | 165/104.26 |
| 2015/0000317 | A1 * | 1/2015 | Murakami | H05K 7/20836 |
| | | | | 62/190 |
| 2018/0164040 | A1 * | 6/2018 | Kusano | F28D 15/046 |
| 2021/0080128 | A1 * | 3/2021 | D'Arcy | F28D 1/024 |
| 2021/0302104 | A1 * | 9/2021 | Goodwin | F28D 15/043 |

FOREIGN PATENT DOCUMENTS

| | | | |
|---|---|---|---|
| JP | H24 2012251750 | A | 12/2012 |
| JP | H242012251750 | A | 12/2012 |
| WO | 2001004549 | A1 | 1/2001 |
| WO | WO 2001004549 | A1 | 1/2001 |
| WO | 2014099806 | A1 | 6/2014 |
| WO | WO 2014099806 | A1 | 6/2014 |

* cited by examiner

HEAT PIPE THERMAL TRANSFER LOOP WITH PUMPED RETURN CONDUIT

CROSS-REFERENCE TO RELATED APPLICATIONS

This application is a continuation of and claims priority benefits from International application No. PCT/GB2019/051557 filed on Jun. 5, 2019 entitled, "Thermal Transfer Loop" which, in turn, claims priority benefits from United Kingdom patent application No. 1809208.0 filed on Jun. 5, 2018, also entitled "Thermal Transfer Loop". The '557 and '208.0 applications are hereby incorporated by reference herein in their entireties.

FIELD OF THE INVENTION

The present invention relates to a heat pipe system for transferring thermal energy from a heat source to a heat sink.

Thermal management of buildings and infrastructure uses over 20% of the world's energy and is responsible for significant $CO_2$ emissions resulting from heat and electricity generation. The demand for energy related to this is expected to increase significantly over the coming years due to high rate of growth in areas such as server farms (partly stimulated by blockchain adoption) or comfort cooling in homes and other buildings (with instances of whole stadiums or small districts cooled in some cases).

Heat pipes transfer heat from a heat source to a heat sink over a given distance through the evaporation and condensation of vapor. Heat pipes usually include a working fluid which is heated in an evaporator via a heat source until it evaporates. The vapor travels to a heat sink where it condenses. In order for the heat pipe to function, the condensate must return to the evaporator so that the evaporation/condensation cycle can continue.

In thermosiphons, the condensate returns to the evaporator by its own weight. Therefore, thermosiphons are a gravity-assisted type of heat pipe.

Heat pipes can use a wick to return the condensate to the evaporator via capillary action. The wick can transport the condensate in any direction, including against gravity. This allows heat pipes to transfer heat in any direction. However, heat pipes with wicks have a number of disadvantages due to the limitations of the capillary forces, including, for example, large thermal resistance.

Examples of prior art devices can be found in GB1028179A and WO2014099806A1. The device disclosed in GB1028179A is a fluid heating system (rather than a heat pipe). The device disclosed in WO2014099806A1 is a heat pipe which includes a wick.

SUMMARY OF THE INVENTION

The present disclosure seeks to provide an improved heat pipe system that can transfer thermal energy in any direction.

According to an aspect of the present disclosure, there is provided a heat pipe system including:

a heat pipe having a first end and a second end for transferring working fluid from the first end to the second end;

a first reservoir in fluid communication with the first end for holding working fluid in liquid form;

a first heat exchanger at the first end for transmitting thermal energy from a heat source to working fluid in the first reservoir in order to vaporize said fluid;

a second heat exchanger at the second end for transmitting thermal energy from vaporized working fluid to a heat sink thereby condensing said fluid;

a return conduit for returning condensed working fluid from the second end to the first end; and a pump for pumping the condensed working fluid from the second end to the first end along the return conduit;

wherein the heat pipe, the return conduit and the first reservoir form a hermetically sealed circuit, and wherein the pump is located inside the sealed circuit and is configured to be driven from outside the sealed circuit.

By providing a pump for pumping the condensed working fluid, the heat pipe system is advantageously able to transfer thermal energy in any direction and over significantly larger distances compared to known heat pipe systems.

Preferably, the pump is driven by a motor located outside the sealed circuit and the pump is magnetically coupled to the motor. The use of magnetic coupling ensures that there is no physical connection between the pump and the motor which means that the motor can be located entirely outside the sealed circuit. This reduces considerably the risk of the circuit leaking (for example through a physical coupling) and increases the lifespan of the motor, as it is not subjected to wear caused by cavitation within the circuit.

However, in some circumstances such disadvantages may be acceptable (for example in a low-use system), in which case the motor could be co-located with the pump within the circuit, and driven from outside the circuit by means of an electrical connection between the inside and outside of the sealed circuit. The use of an electrical connection can nevertheless limit the risk of leakage from the circuit.

In some embodiments, the return conduit may be separate from the heat pipe.

Preferably, the heat pipe does not have a wick.

Preferably, the pump includes an impeller for driving the condensed working fluid.

Preferably, the pump is configured to operate intermittently.

This enables the heat pump system to keep the level of the working fluid in the evaporator of the heat pipe at the needed value for smooth operation of the system.

Preferably, the first end of the heat pipe is higher than the second end of the heat pipe.

Preferably, the heat pipe extends from the first reservoir initially in an upward direction.

Preferably, the heat pipe extends from the first reservoir in an upward direction and then in a downward direction towards the second end.

Preferably, the heat pipe comprises a hollow tube at least partially insulated over a central section between the first end and the second end.

Preferably, the system includes a second reservoir in fluid communication with the second end for holding condensed working fluid in liquid form before it is returned to the first end of the heat pipe.

According to another aspect of the present disclosure, there is provided a method of transferring thermal energy using a heat pipe system of any preceding claim and including the steps of:

thermally contacting the first heat exchanger to a heat source in order that the first heat exchanger transmits thermal energy to a working fluid in the first reservoir, thereby vaporizing the working fluid;

transferring the vaporized working fluid along the heat pipe from the first end to the second end;

condensing the vaporized working fluid in order that thermal energy is transmitted from the working fluid via the second heat exchanger to the heat sink; and driving the pump located inside the sealed circuit from outside the sealed circuit in order to return the condensed working fluid from the second end to the first end by pumping it along the return conduit.

Preferably, the method includes driving the pump from a magnetically coupled motor located outside the sealed circuit.

BRIEF DESCRIPTION OF THE DRAWINGS

Embodiments of the present disclosure are described below, by way of example only, with reference to the accompanying drawing, in which.

DESCRIPTION OF ILLUSTRATIVE EMBODIMENT(S)

Figure 1:
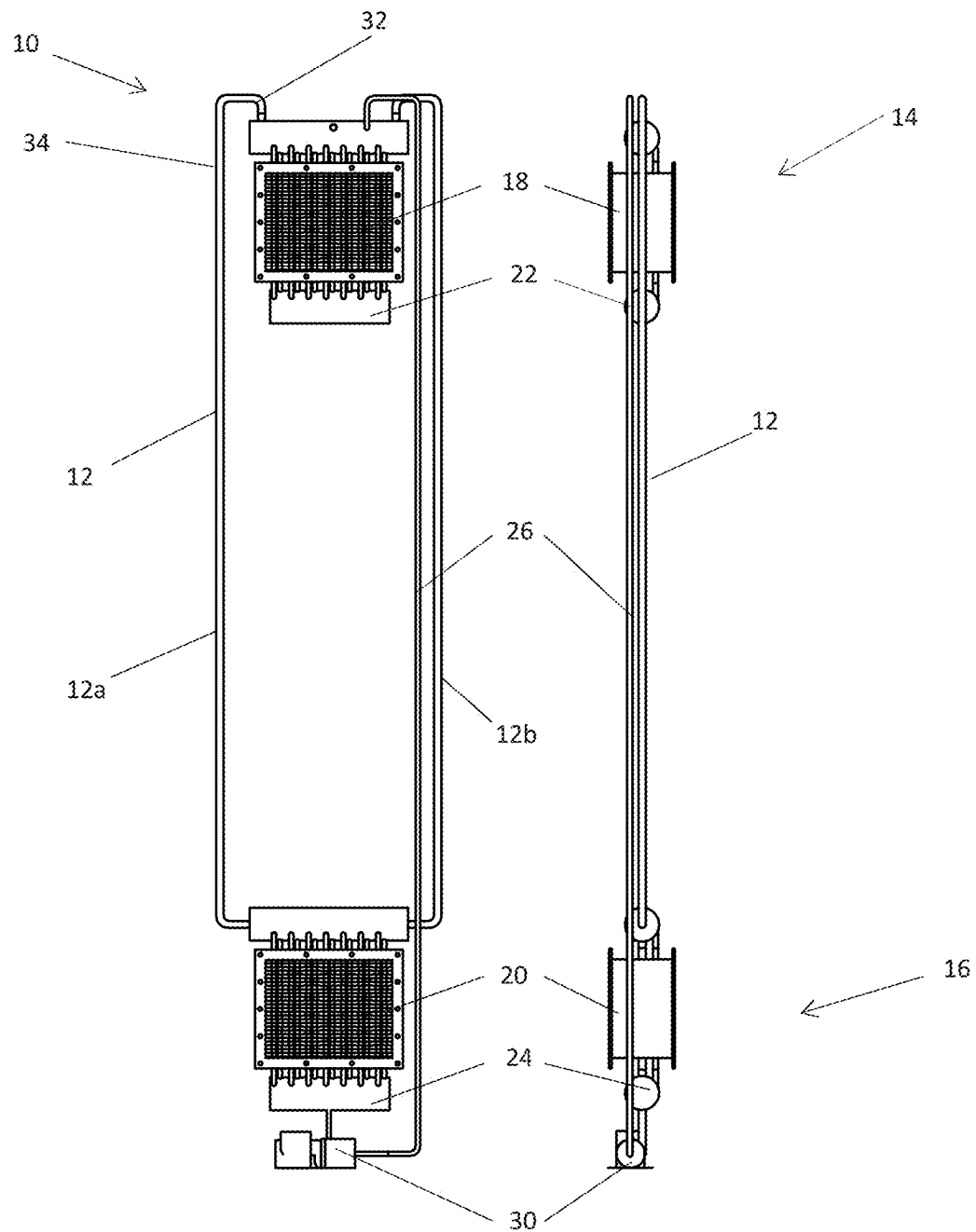
FIG. 1 is a schematic diagram in front and side elevation of a heat pipe system as described herein.

It is to be understood that the drawing is schematic only and does not necessarily show the elements in proportion.

The present application provides an improved heat pipe system that can transfer thermal energy in any direction.

Referring to FIG. 1, this shows a heat pipe system 10 including a heat pipe 12, the heat pipe 12 includes a first arm 12a and a second arm 12b located on either side of the heat pipe system 10. The heat pipe 12 includes a first end 14 and a second end 16 and includes working fluid inside the heat pipe 12. In this embodiment the working fluid may be water or a refrigerant such R134a, R410, etc., but may be any working fluid known to those of skill in the art.

The heat pipe system 10 includes a first heat exchanger 18 at the first end 14 of the heat pipe 12 and a second heat exchanger 20 at the second end 16 of the heat pipe 12. In this embodiment, the first heat exchanger 18 is an evaporator and the second heat exchanger 20 is a condenser. The evaporator 18 is connected to a heat source (not shown) and the condenser 20 is connected to a heat sink (not shown).

The heat pipe system 10 includes a first reservoir 22 in fluid communication with the first end of the heat pipe 12 for holding the working fluid in liquid form. In this embodiment, the heat pipe system 10 also includes a second reservoir 24 in fluid communication with the second end of the heat pipe 12 for holding condensed working fluid in liquid form.

The heat pipe system 10 includes a return conduit 26 connecting the first end 14 and the second end 16 of the heat pipe 12. The heat pipe 12, the return conduit 26 and the first reservoir 22 form a hermetically sealed circuit. The heat pipe system includes a pump 30 located within the sealed circuit and driven from outside the sealed circuit. In other words, the pump 30 is vacuum sealed within the circuit. The pump is driven by a motor (not shown) located outside the sealed circuit. The pump is coupled to the motor, for example by an electrical connection or a magnetic connection. In some preferred embodiments, the pump is magnetically coupled to the motor.

The pump 30 is connected to the return conduit 26 and pumps the working fluid from the second end 16 to the first end 14. The pump 30 includes an impeller for pumping the working fluid.

The first end 14 of the heat pipe is located higher than the second end 16 of the heat pipe and, in this embodiment, the first heat exchanger 18 is located above the second heat exchanger 20.

The heat pipe 12 extends from the first reservoir 22 initially in an upward direction and then extends in a downward direction towards the second end. In other words, a first section 32 the heat pipe 12 extends in an upward direction and a second section 34 of the heat pipe 12 adjacent the first section 32 extends in a downward direction.

The heat pipe system 10 is a wickless system.

In use, the evaporator 18 transmits thermal energy from the heat source to the working fluid in the first reservoir 22. The received thermal energy causes the working fluid to vaporize into vapor. The working fluid vapor travels along the heat pipe 12 from the first end 14 to the second end 16. Working fluid vapor at the second end 16 provides thermal energy to the heat sink by way of the condenser 20 and causes the working fluid vapor to condense to a condensed working fluid which collects in the second reservoir 24.

The pump 30 includes an impeller which pumps the condensed working fluid from the second end 16 to the first end 14 of the heat pipe 12 via the return conduit 26. In some preferred embodiments, the magnetically coupled pump 30 is driven by the motor by the magnetic coupling which couples the motive force of the motor to the pump within the sealed circuit.

The pump 30 drives the condensed working fluid in any direction, including against gravity, without the need for a wick to bring the condensed working fluid from the condenser 20 back to the evaporator 18. This allows the first end of the heat pipe to be located above the second end and the condenser 20 can therefore be located below the evaporator 18.

The heat pipe system 10 is a wickless heat pipe which can operate in any direction, including against gravity. This allows the system to transfer many orders of magnitude more heat (to the order of many (to the order of many MWs if needed) when compared with wicked heat pipes that are bound by the limitation of the capillary forces in the used wicks. In addition, by not requiring a wick in the heat pipe system, the overall thermal resistance within the system is much lower due to the reduction in the conduction thermal resistance that a wick introduces. This allows the heat pipe system 10 to be produced at much lower cost.

Prior art refrigerators pumps are costly and complex with very limited use in heat pipe applications due to the fact that the working fluid frequently operates at pressures orders of magnitude above or below ambient and requires almost absolute levels of sealing. The heat pipe system 10 can not only be manufactured at a cost up-to 100 times lower than commercially available alternatives while being more robust and offering longer life expectancy but also enable low cost or high-performance heat pipe solutions in areas that required more costly and energy hungry alternatives such as heat pumps, enabling better energy management solutions at a lower cost.

The magnetic coupling enables the pump to be decoupled. In other words, the pump is driven from the motor outside the heat pipe system 10 without the need for physical couplings to the motor, allowing the heat pipe system 10 to be kept sealed. The magnetic coupling also enables the motor driving the pump 30 to be outside the heat pipe system 10, keeping the motor separate from the working fluid.

The heat pipe system 10 provides a decoupled, vacuum sealed pump capable of reliable, long term operation in various heat pipe designs, significantly expanding heat pipe application and reducing their manufacturing costs. The pump 30 provides almost absolute level of sealing enabling the heat pipe working fluid to be circulated in a hermetically-sealed loop under working pressures of many orders of magnitude above or below ambient.

The heat pipe system 10 can revolutionize the thermal transfer industry enabling introduction of previously unviable applications in various markets, from almost passive cooling of server farms to energy efficient thermal management of homes, solar energy harvesting or even industrial scale heat recovery—when the heat source is located higher than the heat sink. For example, to transfer the heat energy from a solar collector to a pool or to the house, a pumped single-phase loop is needed. The heat pipe system 10 can transfer thermal energy directly from the solar collector to the house/pool passively with no need for pumping anymore. The same applies for data centers that are located near the seaside or lakes. The heat pipe system 10 can transfer heat passively from these structures to the water leading to large space and cost savings.

The heat pipe system 10 also provides a significantly simplified heat pipe design that will not only be manufactured at a cost up-to 100 times lower than commercially available alternatives while being more robust and offering longer life expectancy but also enable low cost high performance heat pipe solutions in areas that required more energy hungry alternatives such as heat pumps. As such it could provide benefits in various new fields such as building-size HVAC applications, data center cooling or even in the space industry enabling better energy management solutions at a much lower cost.

The heat pipe system 10 uses a wickless heat pipe that can transfer heat against gravity. The pump 30 returns the condensed working fluid back to the evaporator in order for it to boil and complete the boiling/condensation cycle.

The heat pipe system 10 provides a reduced cost heat pipe that can operate against gravity (e.g. in zero gravity applications, in transferring heat from solar roofs to ground level, in data centers that are located at higher levels). The heat pipe system 10 can transfer many orders of magnitude heat when compared with wicked heat pipes that are bound by the limitation of the capillary forces.

The heat pipe system 10 provides the following benefits:

Economic Benefits:

1. Lower initial cost: System 10 has a manufacturing cost which can be >10 times lower than the cost of alternative systems due to its simplicity. The long-life span and the durability and the compact size of the system in comparison the alternative reduce the initial and the recurrent CAPEX.

2. Lower operational cost: The high heat transfer capability of the system offers huge energy saving for low energy consumption of the heat pipe system 10. The motor which drives the pump consumes few joules for short period while the magnitude of the heat pipe system 10 heat recovery duty is in kW. The high performance of the system and the low maintenance requirements results in lower OPEX and makes the heat pipe system 10 more desirable than other heat recovery solutions.

3. Infrastructure saving.

The energy saving achieved by installing the heat pipe system 10 will reduce the load on the electrical grid and reduces the energy used for heating proposes. This lead to maximize the electricity generation and distribution saving. It is also expected that installing the heat pipe system 10 for heat recovery in buildings will reduce the required energy supply for heating which minimizes the size of the ducts and the size and the cost of the HVAC unit. Installing the heat pipe system 10 which utilizes the free-cooling advantage in the high-intensity energy applications will offer substantial amount of energy saving in these applications. Moreover, it minimizes the space required for the cooling system in comparison to conventional cooling options.

Social Benefits

1. Health: The contribution of the heat pipe system 10 in energy consumption will reduce the emissions produced from electricity or heat generation. In addition, the heat pipe system 10 contributes to building cooling in the summer providing more comfort and reducing the instance of heat stroke indoors.

2. Noise pollution reduction: As the heat pipe system reduces the amount of energy required for heating and cooling the building. This results in reducing the size of the HVAC unit which generates noise during the operation.

Environmental Saving

1. Reduction in electricity demand: the heat pipe system consumes about 80% less of electricity than heat pumps. This leads to lower emissions of CO2, NOx, Sox, and PM that result from power generation. The reduction of these harmful gases contributes to reducing the carbon foot print and helps in fighting the global warming.

2. Reducing the heating demand: the heat pipe system 10 can be utilized in heat recovery from waste processes or exhaust air which reduces the overall heat demand of the building. The heat demand reduction results in less CO2 emitted to generate the heat.

The tests described below detail the numerical and experimental investigations of the heat pipe system 10. The results reflected in the experimental and numerical study validate the concept of the HPHE (Heat Pipe Heat Exchanger) in a dual-purpose ventilation operation.

The symbols used below have the following meaning:

| Symbol | | |
|---|---|---|
| A | Surface area | (m$^2$) |
| $C_p$ | Specific heat | (J/kg.K) |
| $C_{sf}$ | constant, determined from experimental data | |
| D | Diameter | (m) |
| f | Friction factor | |
| g | Gravitational acceleration | (m/s$^2$) |
| h | Heat transfer Coefficient | (W/m$^2$. K) |
| $h_{fg}$ | Latent heat of vaporization | (J/kg) |
| k | Thermal conductivity of liquid | (W/m. K) |
| L | Length | (m) |
| m | Intermediate variable | |
| $\dot{m}$ | mass flow rate | (kg/s) |
| N | number of pipes | |
| Nu | Nusselt number | |
| P | Saturation pressure | (N/m$^2$) |
| Pr | Prandtl number | |
| Q | Heat transfer rate | (W) |
| q | Heat flux | (W/m$^2$) |
| R | Thermal resistance | (° C./W) |
| Re | Reynolds number | |
| T | Temperature | (K.) |
| Greek Symbols | | |
| α | liquid thermal diffusivity | (m$^2$/s) |
| μ | Dynamic viscosity | (kg/m.s) |
| ρ | Density | (kg/m$^3$) |
| σ | Surface tension | (N/m) |
| φ | Correction factor | |
| Subscripts | | |
| av | Refers to average value | |
| c | Condenser section | |
| ci | Corresponds to inner wall of condenser | |
| co | Corresponds to outer wall of condenser | |
| Cond, e | Evaporator wall conduction | |
| Cond, c | Condenser wall conduction | |
| ei | Corresponds to inner wall of evaporator | |
| eo | Corresponds to outer wall of evaporator | |
| f | film | |
| l | Liquid | |
| s | tube | |
| v | Vapor | |
| Supercripts | | |
| n | experimental constant that depends on fluid | |

The system 10 described below has led to the expansion to a system suitable for large scale implementation.

Figure 33:
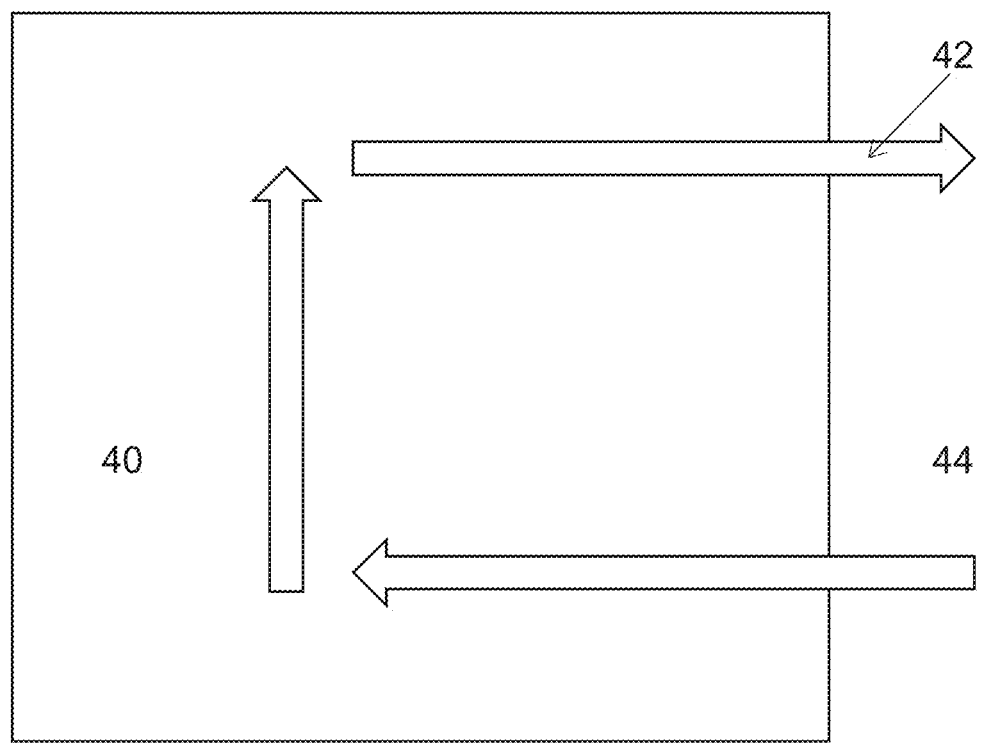
FIG. 33 is a schematic diagram of a current ventilation system as described herein.

Air ventilation systems are a major component in buildings. FIG. 33 shows a current ventilation system. The air ventilation allows fresh air in the building 40 to increase the inside air quality and reduce the CO2 from the air outlet is lost to the outside environment 44. This amount of heat loss 42 can be important, especially during cold season when the room 40 is heated. To recover this wasted heat, a heat pipe system 10 was designed.

Figure 2:
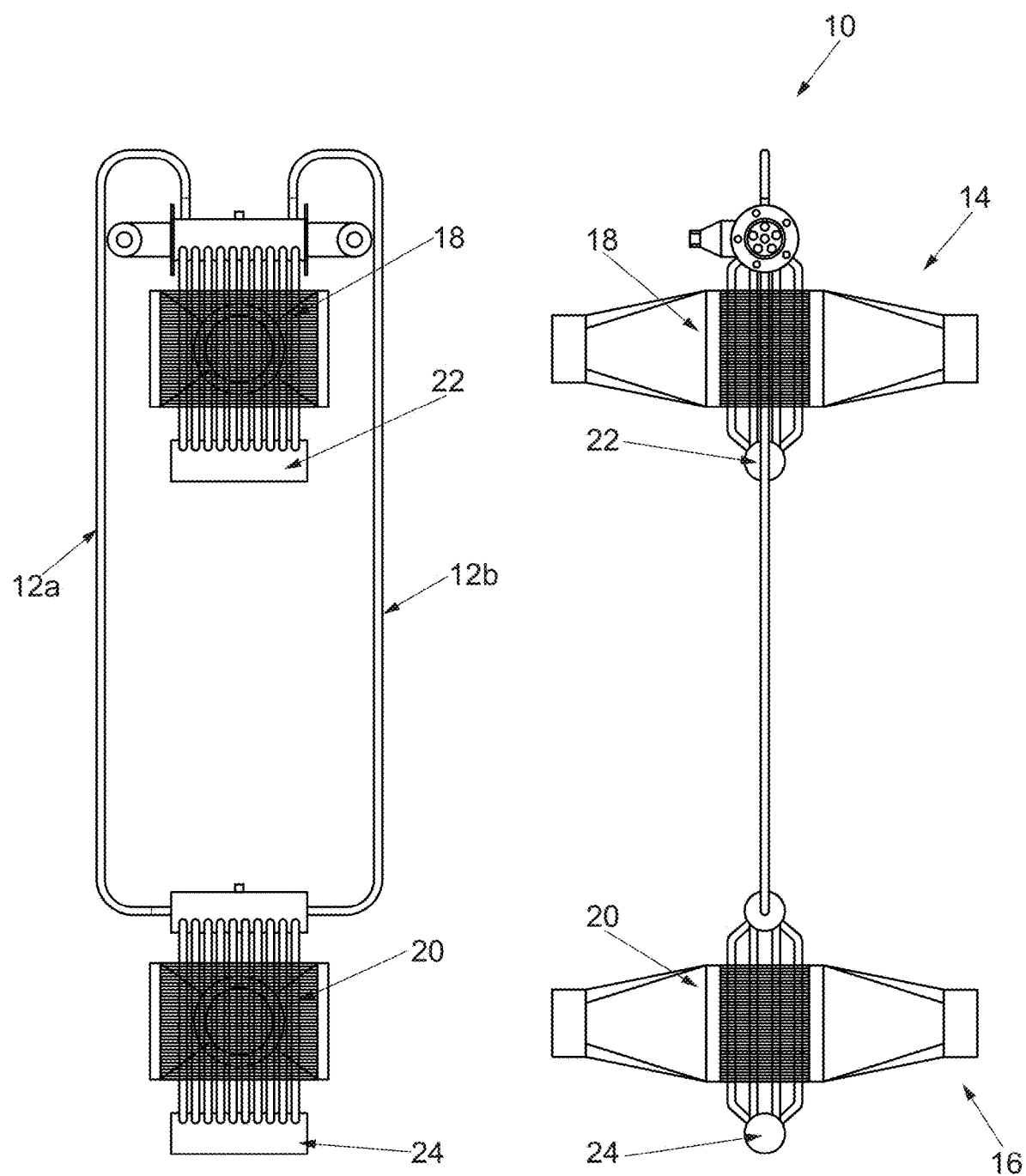
FIG. 2 is a schematic diagram in side and front elevation of a heat pipe system as described herein.

To achieve this challenge, a heat pipe system 10 was designed. As shown in FIG. 2, the system is composed of first heat exchanger 18 and second heat exchanger 20 connected by first arm 12a and second arm 12b on the side.

The heat pipe 10 was designed to operate in two conditions as described below.

Figure 3:
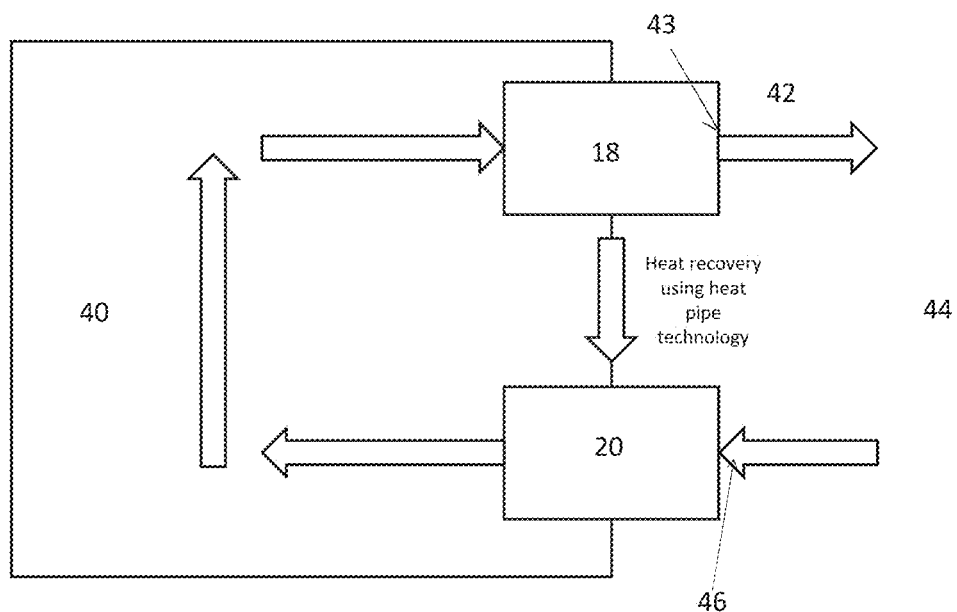
FIG. 3 is a schematic diagram of an installed test rig.

As shown in FIG. 3, the goal is to recover the heat 42 from the outlet 43 of the ventilation system and transfer it to the air intake.

Figure 4:
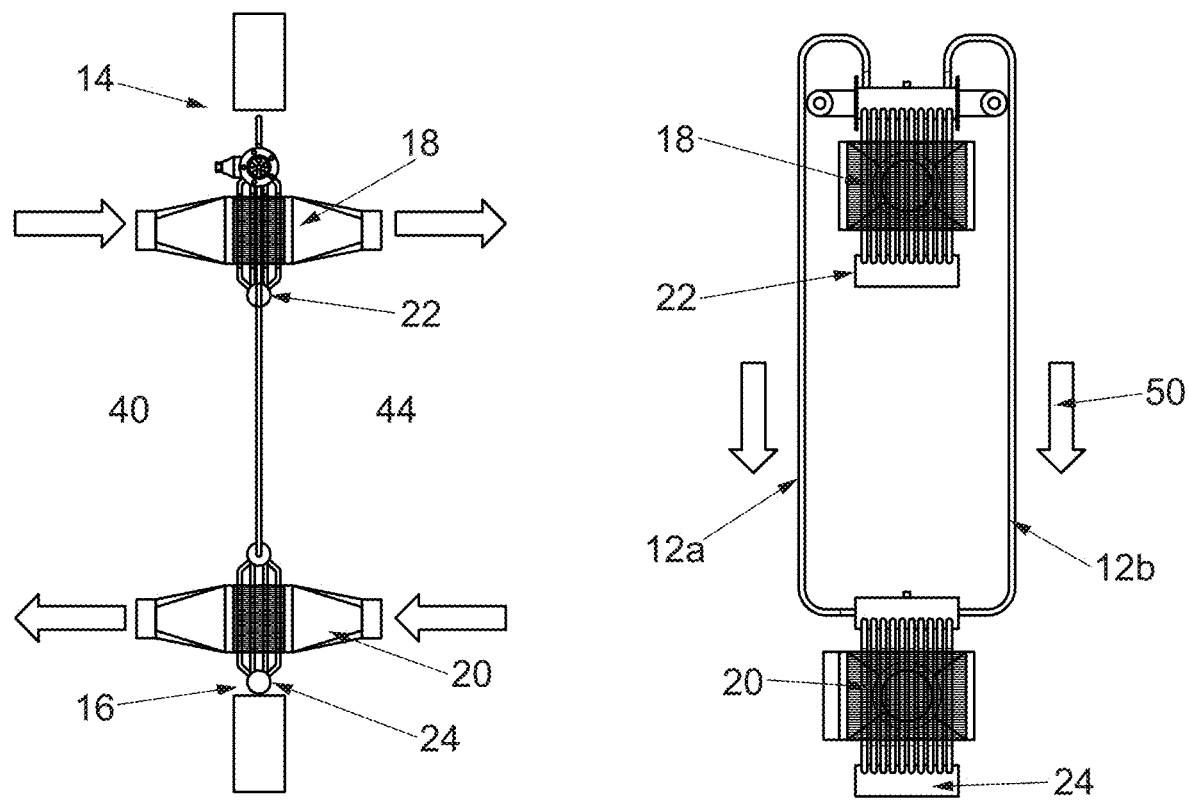
FIG. 4 is a schematic diagram of a heat pipe system in the Heating Condition as described herein.

FIG. 4 shows the system 10 in the first condition. The first condition is the heating of the room 40 using the outlet of the ventilation as a heat source. In this condition, the top section 14 of the heat pipe is considered as the evaporator 18. The heat 42 is extracted from the outlet 43 of the ventilation system and sent to the condenser section (or condenser) 20 in the inlet 46 of the ventilation system. The working fluid will be boiling in the top exchanger 18 and condensed at the bottom of the heat pipe. The vapor 50 will travel to the bottom 16 using the suction of the condensation effect at the bottom heat exchanger 20. Then the heat is used to warm up the room 40 using natural convection.

When the working fluid is completely condensed in the bottom section 16 of the heat pipe, the system 10 enters in the second operating condition: Heat Pipe charging.

Figure 5:
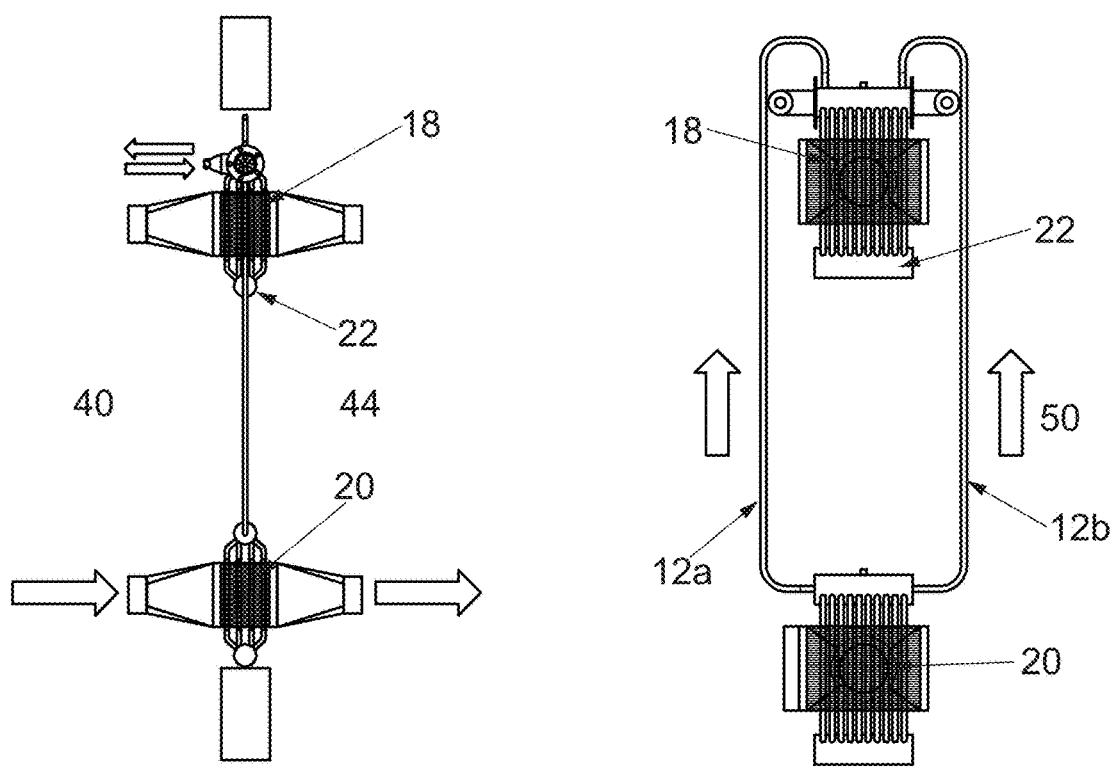
FIG. 5 is a schematic diagram of the heat pipe system of FIG. 4 in the Heat Pipe Charging Condition as described herein.

FIG. 5 shows the system 10 in the second condition. The second condition is the re-charging of the heat pipe system 10 by condensing the working in the top heat exchanger section. In the second condition, the evaporator is located in the bottom heat exchanger while the condenser is located in the top heat exchanger. To condense the working fluid, water runs through a shell and tube located above the top heat exchanger finned section. To vaporize the working fluid, the heat from the room 40 needs to be used. The finned heat exchanger section will use the heat, via natural convection, to boil the working fluid. The ΔT (difference in temperature) between the top and bottom heat exchanger will help the vapor 50 to travel back to the top heat exchanger.

Figure 6:
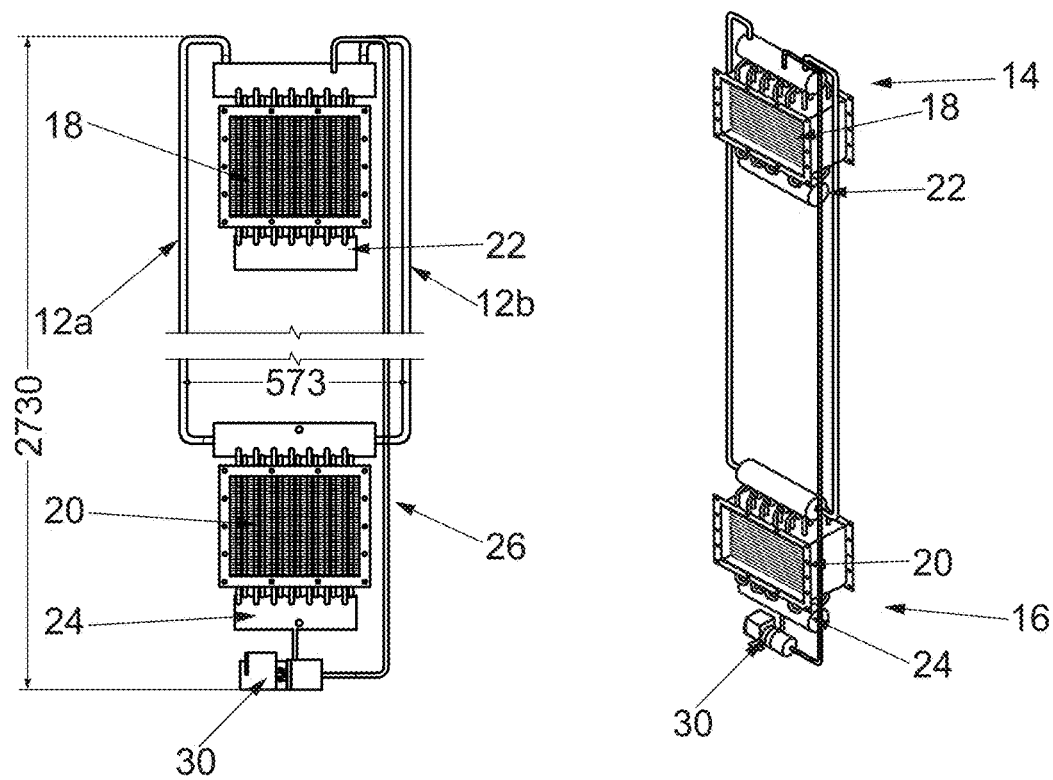
FIG. 6 is a schematic diagram in front and perspective elevation of a heat pipe system with dimensions shown.

FIG. 6 shows a heat pipe system 10 including a pump 30. The pump 30 designed at Brunel University London is installed in order to enhance the flow of working fluid going back to the top heat exchanger.

Figure 7:
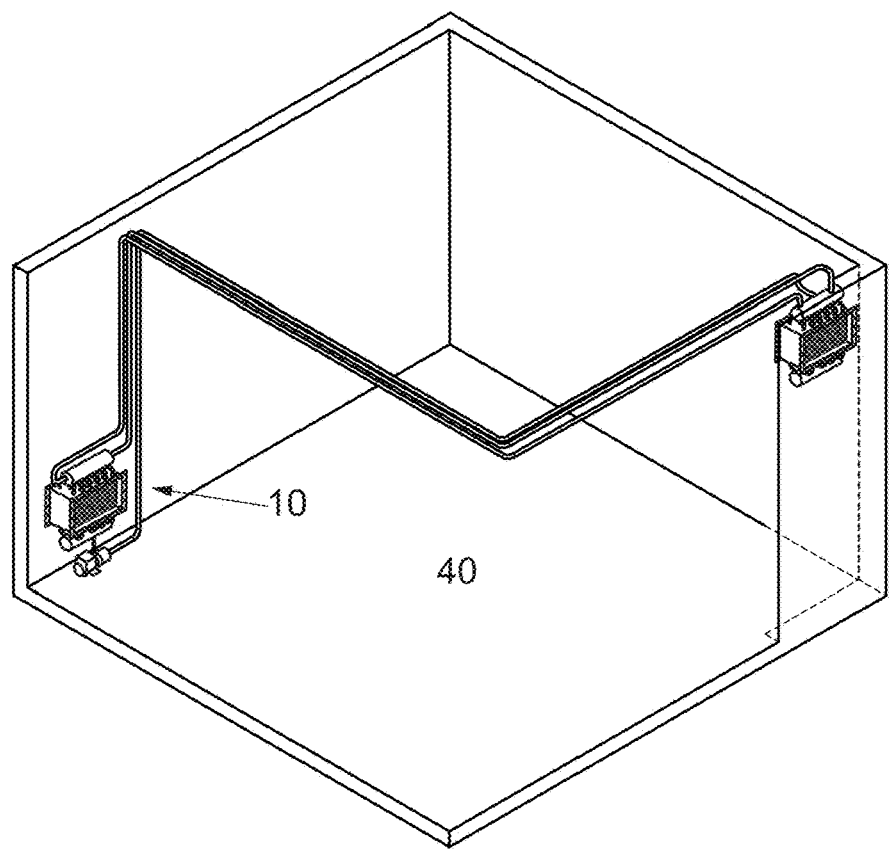
FIG. 7 is a perspective view of a heat pipe system installed in a room.
Figure 8:
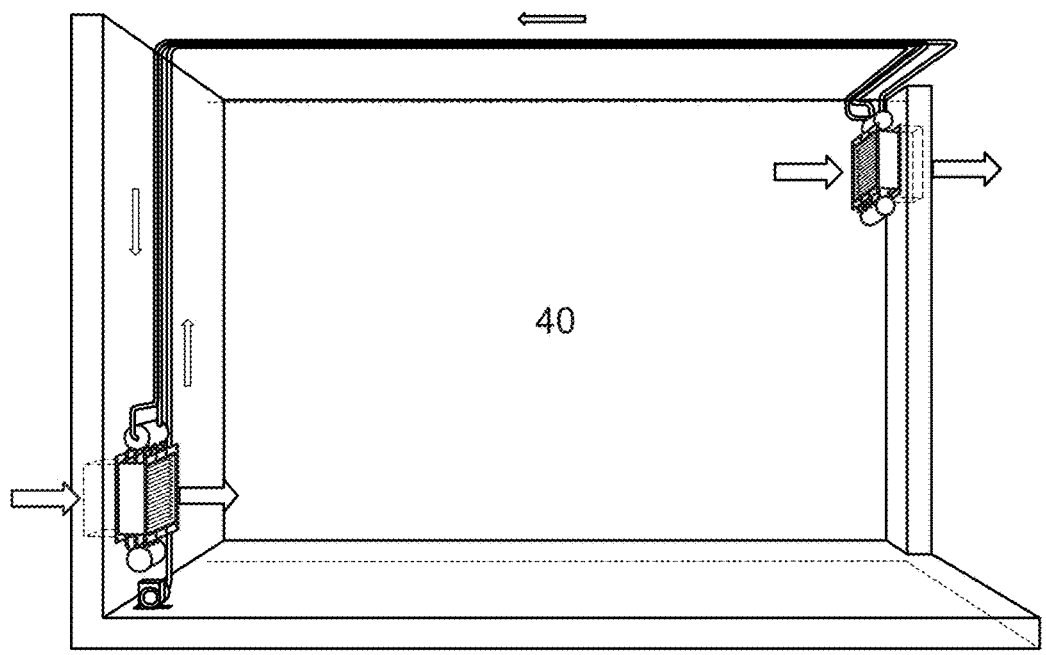
FIG. 8 is a front view of the heat pipe system of FIG. 7 installed in a room.

FIGS. 7 and 8 show the heat pipe system 10 modified to fit in a room 40.

Figure 9:
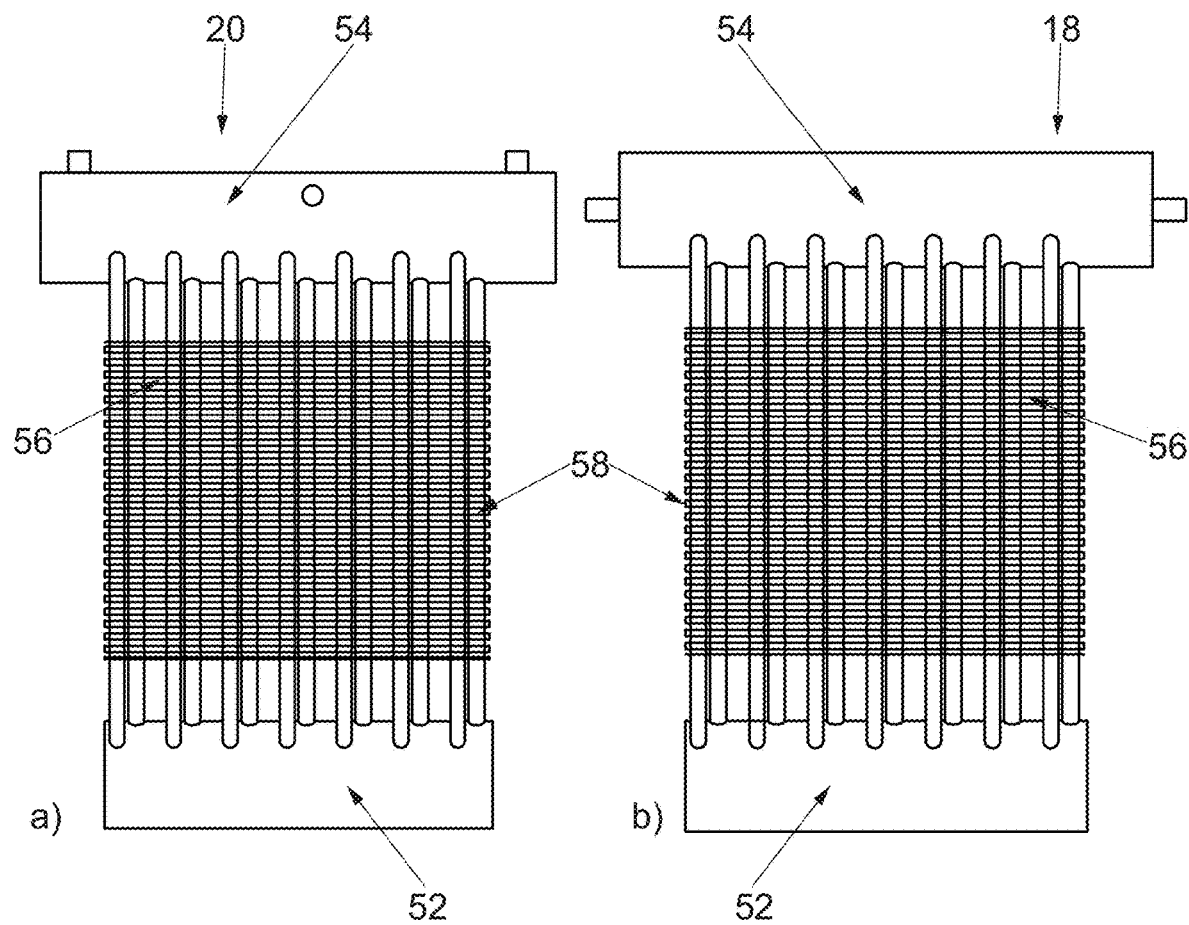
FIG. 9 is a schematic diagram in front elevation of a bottom and top heat exchanger as described herein.

The design of the system 10 can be identified in 3 sections, the bottom heat exchanger 20 (shown in FIG. 9a), the heat pipe pump 30, and the top heat exchanger 18 (shown in FIG. 9b).

The heat 42 is collected at the top 14 of the heat pipe system 10 and extracted at the bottom 16 heat pipe to heat up air from outside the room 40. The working fluid in the heat pipe will condense in the bottom 16 heat pipe. Then, the pump 30 will transfer the working fluid from the bottom 20 to the top 18 heat exchanger.

The heat pipe heat exchanger 18, 20 is made of a bottom collector 52 of ø84 mm, a top collector 54 of ø84 mm and 21 tubes 56 of ø 10 mm. 50 fins 58 have been added on the tube to increase the heat transfer surface area. The material selected is copper 1.5 mm thickness and all the connection are solder using ASMEE B16.22.

The two heat pipes are connected using ¾" tube from the side of the bottom HPHE to the top of the second HPHE. The heat pipe pump 30 is connected to the bottom of HPHE 20 to the top of HPHE 18.

The heat pipe system 10 comprises two heat exchangers 18, 20 at two different levels with a pump 30 located below the bottom heat exchanger 20. The top heat exchanger 18 represents the evaporator of the heat pipe system 10 where it absorbs the heat 42 from the outgoing air and transfers the heat to the working fluid which evaporates and moves to the bottom heat exchanger 20. The working fluid vapor condenses at the bottom heat exchanger 20 rejecting the heat to the fresh air. This process is ended when the whole amount of the working fluid at liquid phase at the top transports to the bottom heat exchanger 20. To continue the cycle of the heat transfer process from the top heat exchanger 18 to the bottom heat exchanger 20, the liquid working fluid is returned to the top heat exchanger 18 by the pump 30. The pump 30 is controlled through a timer to work intermittently for certain duration.

Figure 10:
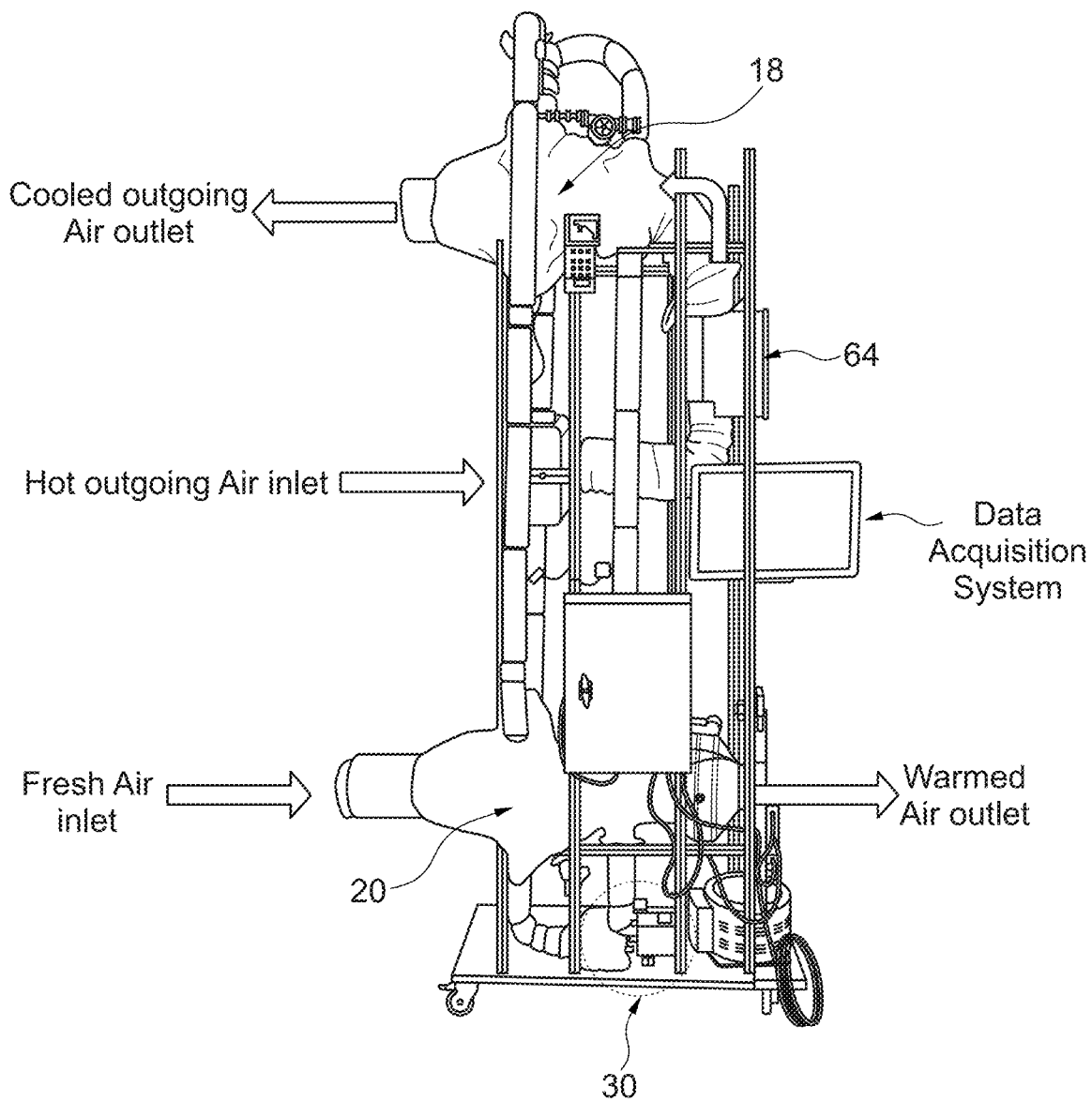
FIG. 10 is a front view of an experimental set-up of the heat pipe system as described herein.
Figure 11:
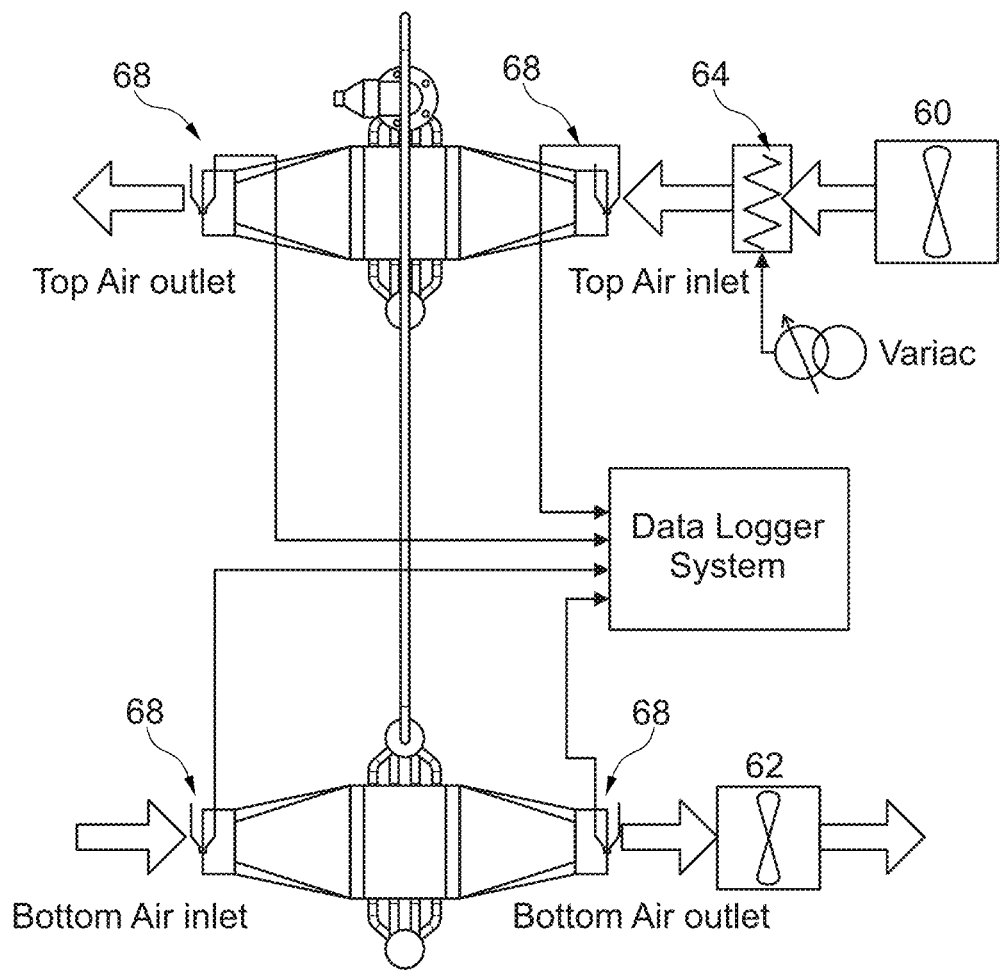
FIG. 11 is a schematic diagram of a test rig for the heat pipe system as described herein.

FIG. 10 shows the test rig at the lab and FIG. 11 shows a schematic drawing of the test rig and the thermocouple positions. The test rig consists of the heat pipe system 10 with fans 60, 62 to blow the air at each heat exchanger 18, 20. K-type thermocouple are installed in the air flow before and after the heat exchanger in addition to thermocouples 68 to measure the temperature of the working fluid in the heat pipe. The volumetric air flow rate was measured using an anemometer. A duct heater 64 was used to heat the air going through the top heat exchanger 18 to test the system 10 at different temperatures.

The system 10 was tested at different conditions to evaluate the thermal performance represented by the heat recovery. Heat Pipe Heat Exchanger thermal performance is influenced by the mass flow rate of the heat source and the heat sink the temperature difference between the heat source and the heat sink, and the working temperature of the working fluid.

Table 1 below summarizes the conditions of the tests that were carried out to evaluate the system performance.

TABLE 1

| | Test conditions | | |
|---|---|---|---|
| Test # | Top Flow rate (kg/s) | Bottom Flow rate (kg/s) | Pump intermittent |
| Test 1 | 0.036 | 0.0231 & 0.0353 | Every 15, 5, 1 minutes |
| Test 2 | 0.367 | 0.0116 | Every 3 mins for 15 seconds |
| Test 3 | 0.037 & 0.012 | 0.011 | Every 3 mins for 15 seconds |
| Test 4 | 0.012 | 0.011 | Every 3 mins for 15 seconds |

TABLE 1-continued

| | Test conditions | | |
|---|---|---|---|
| Test # | Top Flow rate (kg/s) | Bottom Flow rate (kg/s) | Pump intermittent |
| Test 5 | 0.021 | 0.021 | 3, 10, 1 minutes for 15 seconds |

Figure 12:
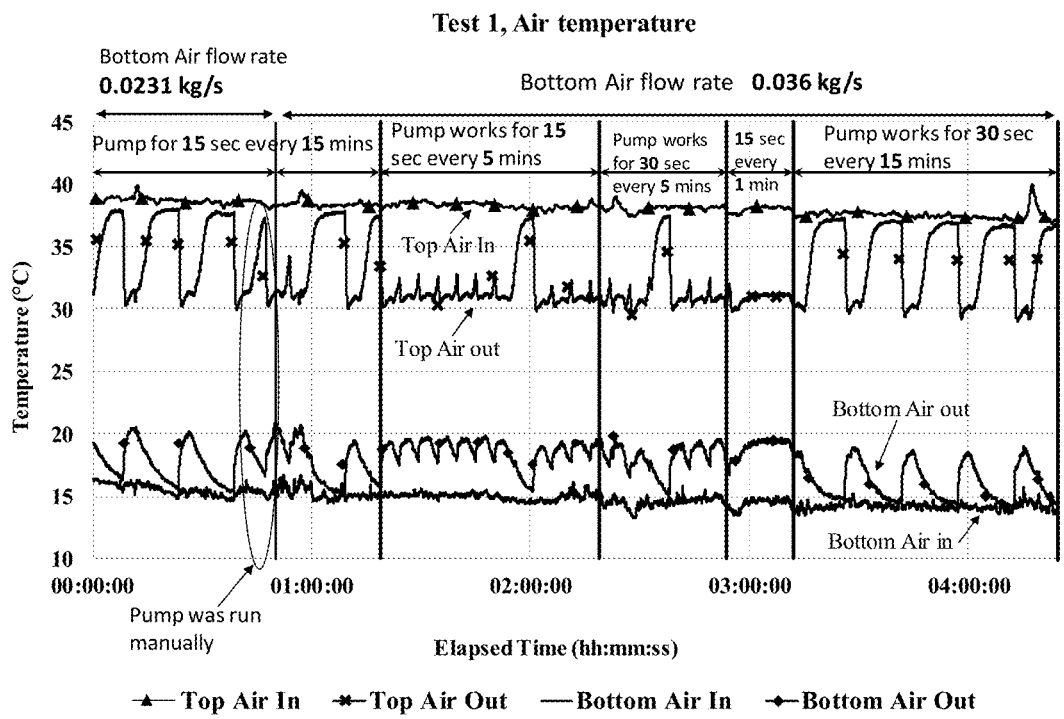
FIG. 12 is a graph showing the air temperature results of Test 1.
Figure 13:
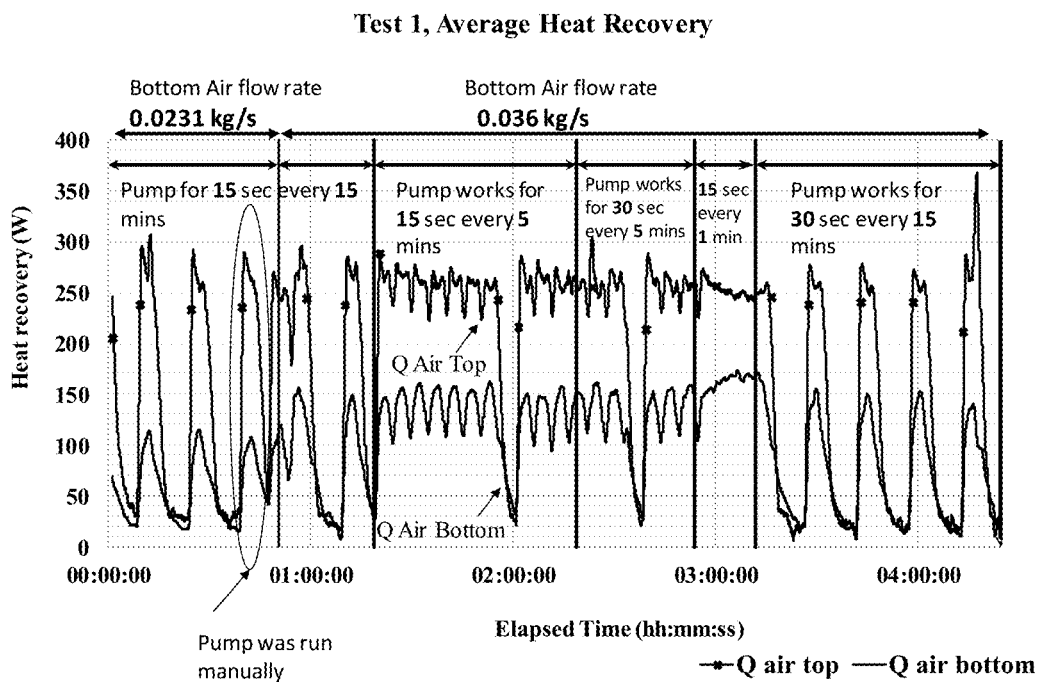
FIG. 13 is a graph showing the average heat recovery results of Test 1.

FIGS. 12 and 13 show the results obtained from running Test 1. Test 1 was conducted to study the effect of the pump intermittence on the performance of the heat pipe pump system 10. As described above, the working fluid evaporates at the top heat exchanger 18 and flows towards the bottom heat exchanger 20. As the amount of the working fluid decreases in the top heat exchanger 18, the effective heat transfer area decreases also which results in less amount of heat being transported to the bottom heat exchanger 20. In similar way at the same time, the working fluid fills the bottom heat exchanger 20 which decreases the heat transfer area with the heat sink. This also results in decreasing the effectiveness of the system.

The experiment was conducted at a fixed air flow rate at the top heat exchanger 18 and at two different mass flow rates of the air at the bottom heat exchanger 20. To achieve a temperature difference between the bottom heat exchanger and the top, the air was heated by duct heat 64 before it passes through the top heat exchanger. FIG. 12 shows the air temperatures of the inlet and outlet at the top and the bottom heat exchanger. It can be clearly seen that the difference between the inlet and outlet temperature occurs when the working fluid is pumped to the top heat exchanger. As the amount of the liquid working fluid decreases at the top heat exchanger 18, the air outlet temperature at the top heat exchanger increases until it reaches a value nearly equal to the inlet temperature. At the bottom heat exchanger, the outlet temperature of the cold air increases when the working fluid is pumped to the top due to the condensation of the vapor at the inner surface of the heat exchanger. It can be noted that fluctuation in the temperature when pump works every 5 minutes is much less than the case for pumping every 15 minutes. By comparing the work duration of the pump 30 between 15 seconds and 30 seconds every 5 minutes did not affect the performance. It can be concluded that the duration of 15 seconds was enough to pump the whole amount of the working fluid to the top heat exchanger. The best results can be seen when the pump 30 worked every 1 minutes.

FIG. 13 presents the results of the heat recovery at Test 1. The amount of heat recovery was fluctuating in similar behavior of the fluctuation of the temperatures. It can be noted that the amount of heat recovery increased by increasing the mass flow rate of air at the bottom as a result of the enhancement of the heat transfer coefficient. The fluctuation was minimized at the case of pump 30 working every 1 minutes. The heat transfer rate reached 300 W at the top heat exchanger and 110 W at the bottom heat exchanger when the pump worked every 15 mins. While the heat transfer rate became 250 W at the top heat exchanger 18 and 170 at the bottom one 20. The difference in the heat transfer rate between the top 18 and bottom 20 heat exchanger is due to heat losses in the adiabatic line and the collectors of the heat exchangers.

Figure 14:
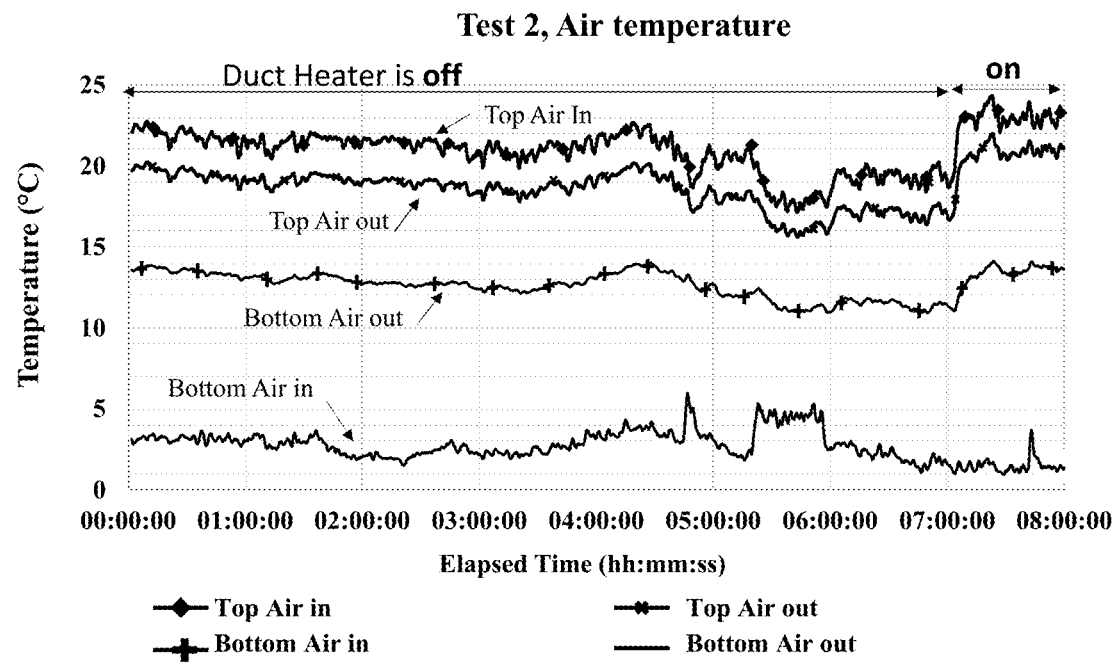
FIG. 14 is a graph showing the air temperature results of Test 2.
Figure 15:
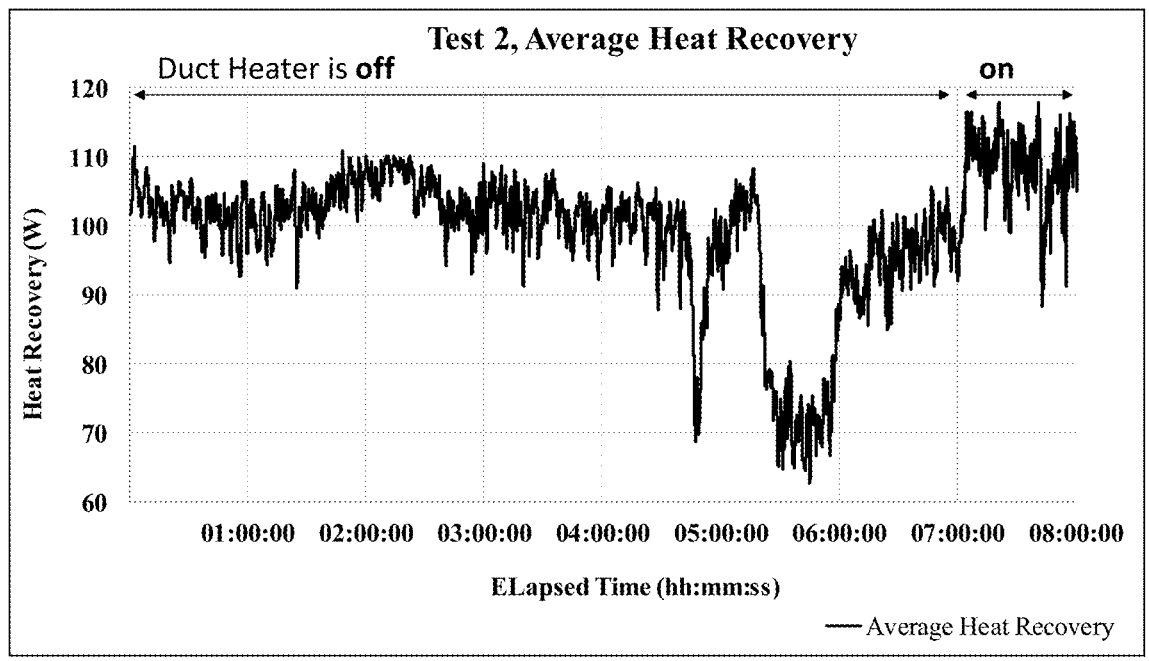
FIG. 15 is a graph showing the average heat recovery results of Test 2.

FIG. 14 shows the results obtained from Test 2. Test 2 tests the system 10 at different conditions from Test 1. The air mass flow rate at the bottom heat exchanger was 0.0116 kg/s which results in higher temperature difference as shown in FIG. 15. The bottom air supply was fresh air from outside the lab at an average temperature of 3° C. The Top air supply was from inside the lab without using the heater at an average temperature of 23° C. At the end of the heating system for the lab was switched off which caused the top air temperature to be decreased. When the temperature difference between the top Air in and the bottom air in is higher, it increases the temperature difference between the outlet and the inlet temperature of the bottom heat exchanger 20. In other words, the heat transfer rate increases with the increase of the temperature between the top and the bottom air. This is shown clearly in FIG. 15 where the heat recovery reached a maximum value of approximately 115 W when the duct heater was switched on and the temperature difference between the top and the bottom was maximized. While the heat recovery was 70 W when temperature difference between the top and the bottom heat exchangers minimized to 13° C.

Figure 16:
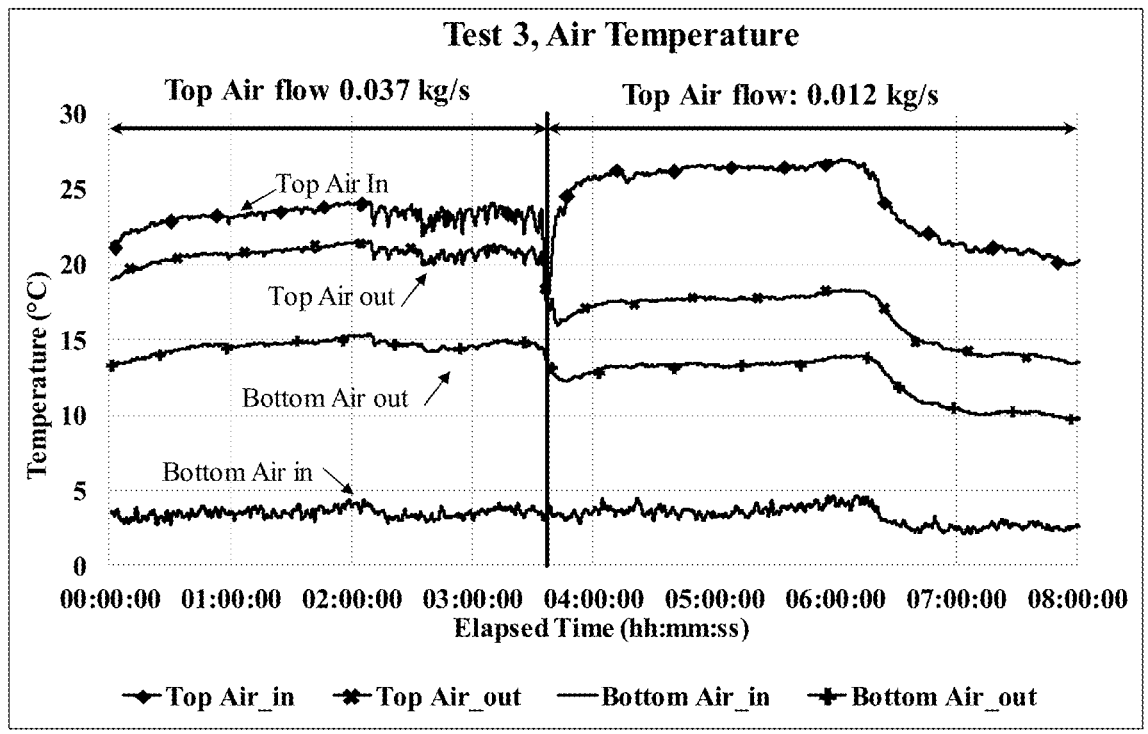
FIG. 16 is a graph showing the air temperature results of Test 3.
Figure 17:
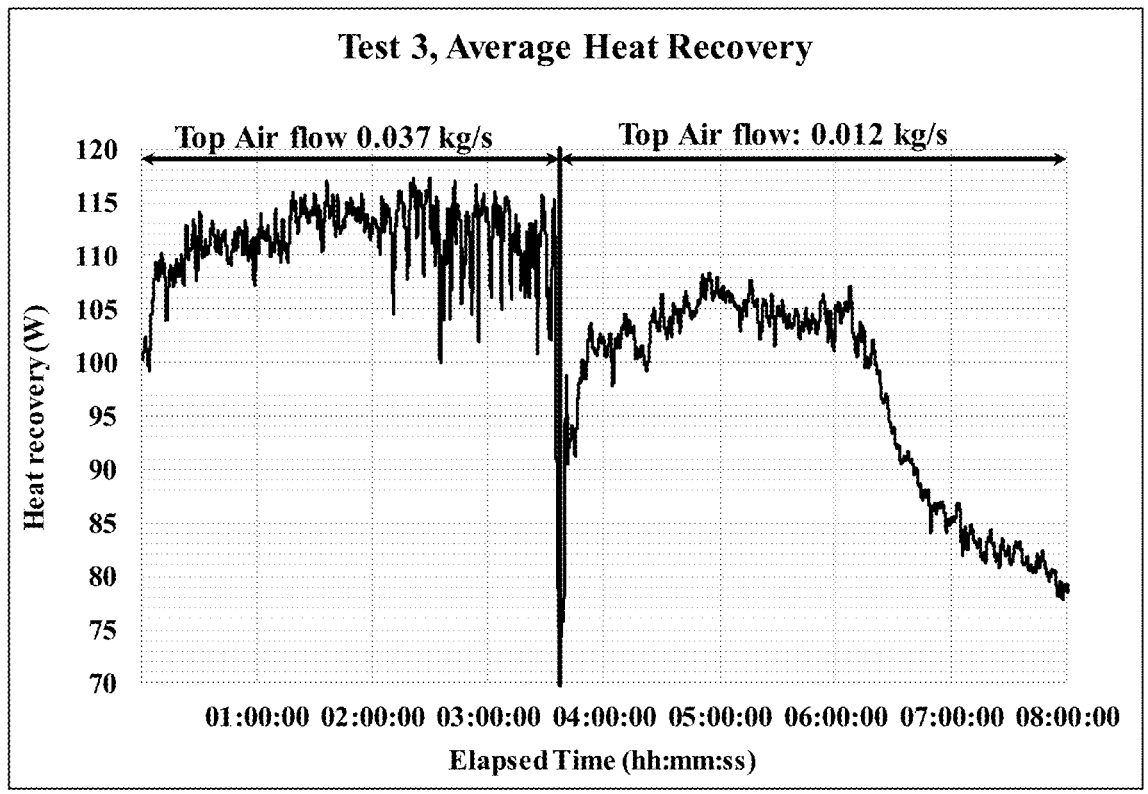
FIG. 17 is a graph showing the average heat recovery results of Test 3.

FIGS. 16 and 17 show the results obtained from running Test 3. Test 3 was conducted to study the effect of the mass flow rate at the top heat exchanger on the thermal performance. The bottom heat exchanger 20 was supplied with fresh air while the top heat exchanger was supplied with warm air from the lab. The air inlet temperature at top was nearly 24° C. and the air inlet temperature at the bottom was 4° C. FIG. 16 presents the air temperatures of the inlet and the outlet of the top 18 and bottom 20 heat exchanger. The fluctuation of the top air inlet temperature is caused by the heating system of the lab which is switched on and off by a temperature control system. The heat pipe pump system 10 was tested at two different air mass flow rates at the top 0.037 and 0.012 kg/s, respectively. The air mass flow rate at the bottom maintained constant at 0.011 kg/s. It can be noted from the FIG. 16 that temperature difference between the inlet and outlet at the top was less when the flow rate was higher. In contrast, the temperature difference between the inlet and the outlet at the bottom heat exchanger decreased by decreasing the flow rate at the top. This can be explained by the decrease in the heat transfer rate as it is shown in FIG. 17. The thermal performance is influenced by the mass flow rate that passes through a fixed heat transfer area. The amount of heat recovery decreased from 115 W to 105 W between the cases 0.037 kg/s and 0.012 of top air flow, respectively.

Figure 18:
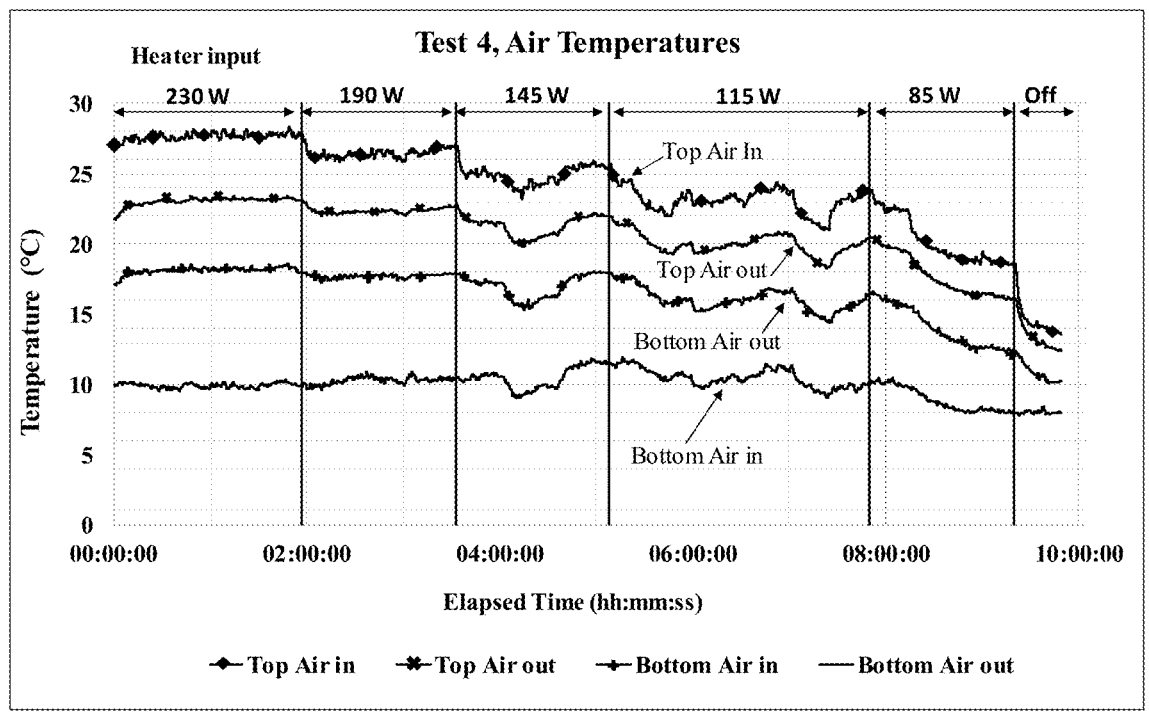
FIG. 18 is a graph showing the air temperature results of Test 4.
Figure 19:
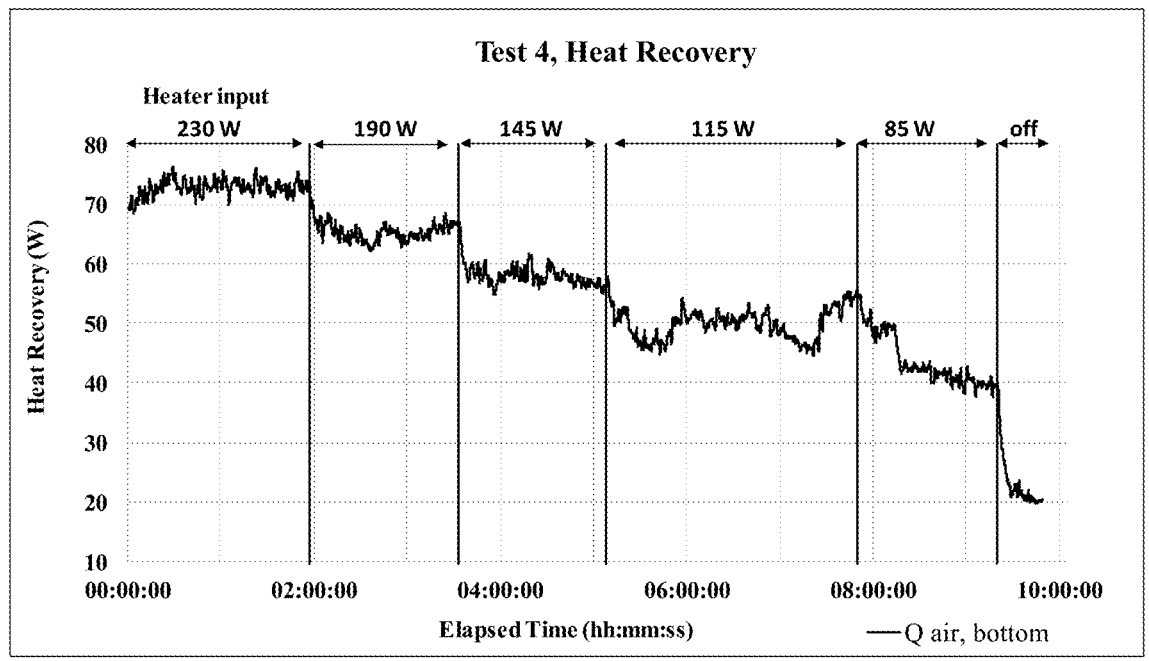
FIG. 19 is a graph showing the average heat recovery results of Test 4.

FIGS. 18 and 19 show the results obtained from running Test 4. Test 4 was carried out to study the effect of the top air temperature on the thermal performance at a constant flow rate at the top and the bottom sections of the system. The bottom air inlet temperature was nearly constant at 10° C. while the top inlet temperature varied between 28° C. and 19° C. The air temperatures during the test are presented in FIG. 18. The top air inlet temperature decreased with the decrease of the heater electrical input where it varied between 28° C. and 19° C. during the different test conditions. The results show that the temperature difference between the inlet and the outlet at the top and the bottom heat exchanger decreases when the top air temperature decreases. FIG. 19 shows the average heat recovery during the test. The average heat recovery decreases by the decrease of the top air temperature. The amount of the heat recovery varied between 75 W to 40 W during the test. The obtained amount of heat recovery is less than the other test due to the low flow rate of the air in comparison to the other test.

Figure 20:
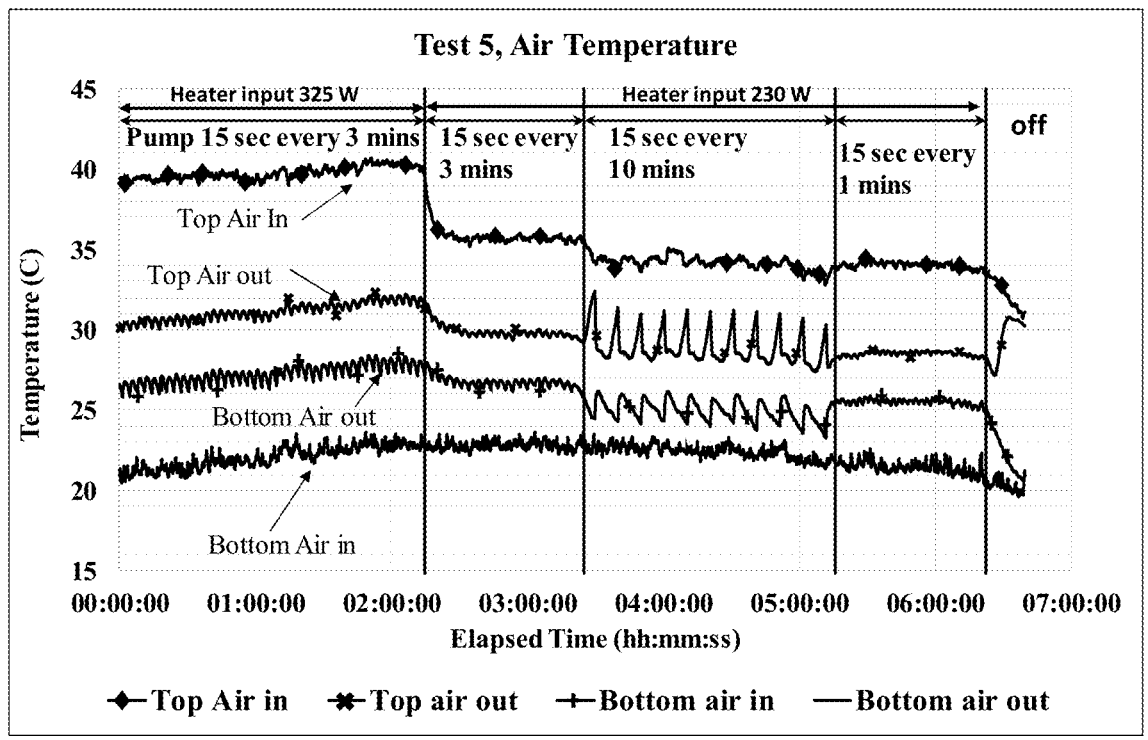
FIG. 20 is a graph showing the air temperature results of Test 5.
Figure 21:
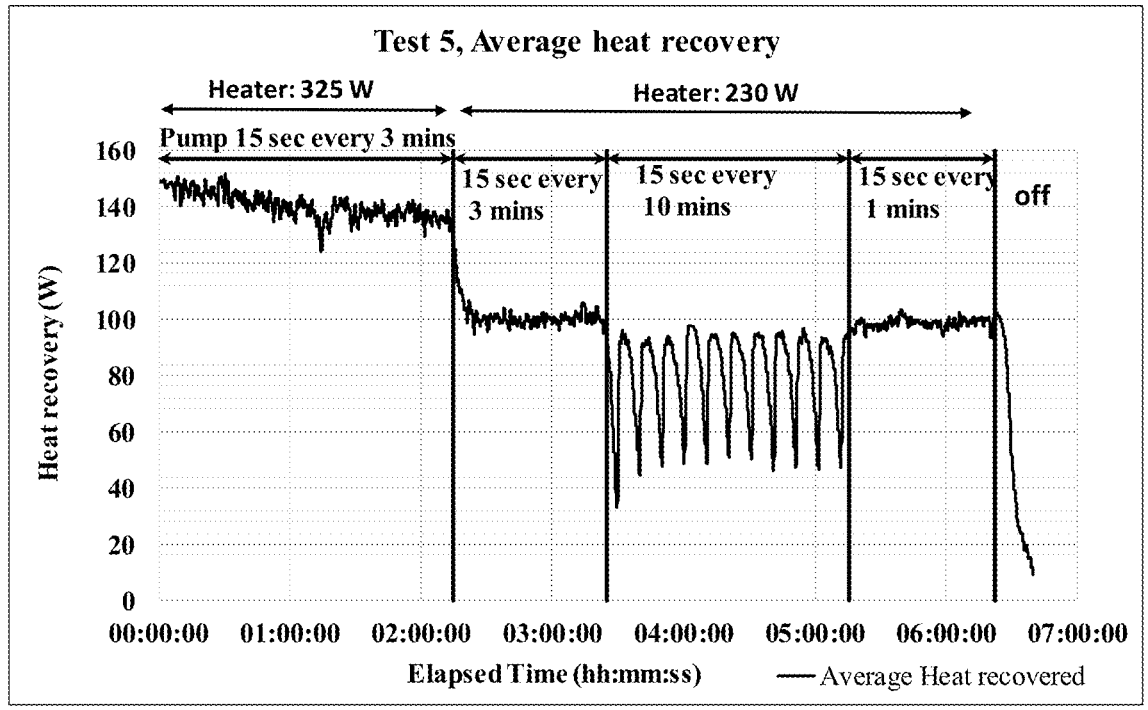
FIG. 21 is a graph showing the average heat recovery results of Test 5.

FIGS. 20 and 21 show the results obtained from running Test 5. Test 5 was conducted to test the effect of the pump on the thermal performance of the system. The air mass flow rate was the same at the top and the bottom heat exchanger at 0.021 kg/s. The air supply was from outside the lab. The test was carried out at two different values of the heater. FIG. 20 shows the temperature of the air at the top and the bottom heat exchangers during the test. At the first two hours of the test the temperature of the top air inlet was much higher than the rest of the test. The outlet temperature of the air at the top and the top was fluctuating because of the pump intermittence. The fluctuation was less when the heater input decreased in comparison to the first case although that the pump working condition is the same. The fluctuation occurs as explained before, but it also depends on the amount of heat recovery. When the top inlet temperature was decreased, the amount of heat transfer capability of the heat pipe was less. Hence into less amount of working fluid flows to the bottom heat exchanger. As a result, the same amount of the working fluid consumes longer time to be totally evaporated. The third case of test where the pump worked every 10 minutes has the most fluctuation among the other cases of this test. In the last case where the pump worked every 1 minute, the fluctuation was minimized.

FIG. 21 illustrates the average heat recovery along the test. The amount of heat recovery was 140 W at the first case and reduced to 100 W at the other conditions of the test. The effect of the pump intermittence on the heat recovery is clearly visible in comparison between the pump working every 3 minutes and every 10 minutes. However, there was no clear difference on the heat recovery when pump worked every 1-minute comparing to every 3 minutes. It is also noted that the fluctuation decreased when the amount of the heat recovery decreased from 140 W to 100 W.

Based on the presented results of the tests it can be concluded that the system 10 is capable of recovering the heat from the hot air as long as the top air temperature is higher than the bottom air temperature. The performance of the system 10 is affected by the inlet temperature of the top and bottom heat exchanger where it increases by the increase of the temperature difference between the top and the bottom. The performance can be enhanced further by increasing the mass flow rate at the top and the bottom heat exchanger. As it is seen from the figures, it is recommended that the pump 30 works every 3 minutes to get a constant outlet temperature of the air. The intermittence of the pump can be increased to make the pump work every 10 minutes or more be developing the design of the collector of the heat exchangers and changing the tube diameter and length.

The current development of the CFD model is based on the operation of the lab scale version developed at Brunel University London. The operation of the heat pipe 10 is generally based on the two heating and cooling cycles described above. The premise of the simulation was used to optimize the system design from both a thermal aspect and the validation of the system.

Figure 22:
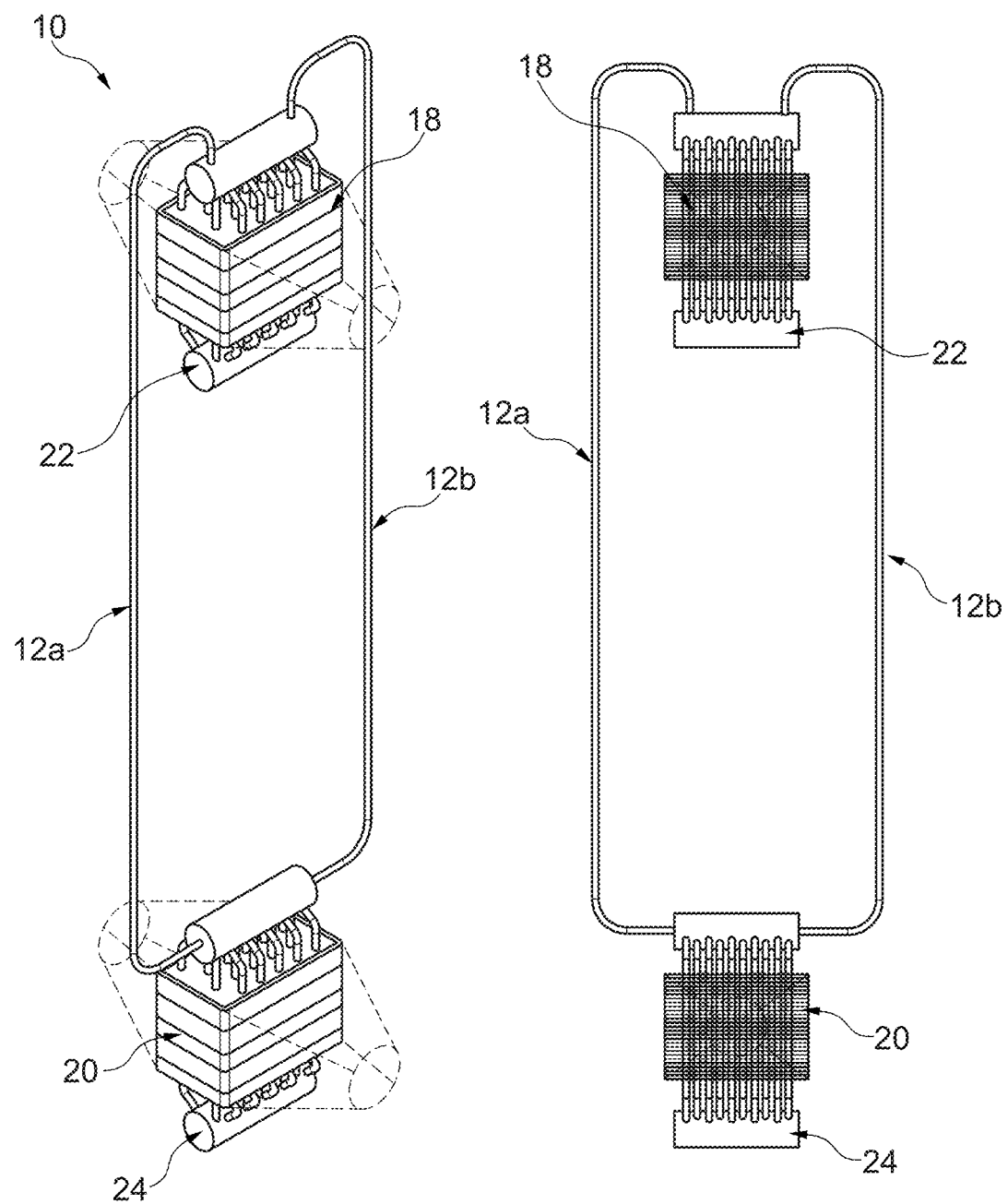
FIG. 22 is a schematic diagram in perspective and front elevation of a heat pipe system as described herein.

The development of the system is based on the design of the ventilation system. The initial geometry configuration will validate the current operation with future developments including the influence of cross streams and buoyancy effects as observed in natural ventilation systems. The baseline CFD study geometry is as shown in FIG. 22. Unlike the experimental set up, the insulation has not been added due to the applicability of wall boundary conditions.

The developed mesh and additional refinements are based on the observations gathered from the mesh independence study.

Before initiating the simulation process; a mesh independence study was conducted. The mesh independence study identifies the optimum cell count, minimizing the computational load whilst maximizing the accuracy of the simulation. The basis of a mesh independence study is to monitor the change in skewness or output results.

TABLE 2

| Cell Type | Density | Element Count | Maximum Skewness |
|---|---|---|---|
| Hexahedral | Coarse | 10,720,491 | 0.4 |
| Hexahedral | Medium | 14,703,802 | 0.66 |
| Hexahedral | Fine | 17,037,190 | 0.88 |
| Tetrahedral | Coarse | 18,028,923 | 0.3 |
| Tetrahedral | Medium | 20,480,031 | 0.54 |
| Tetrahedral | Fine | 27,593,012 | 0.76 |

From the results obtained, it is evident that the skewness achieved with a structured mesh is significantly less in comparison to a tetrahedral mesh. A comparative mesh comparison is shown in the above Table 2. Table 2 shows the decrease in skewness with the increase in cell count. The relationship between mesh density and cell type is evident with a higher skewness level.

Figure 23:
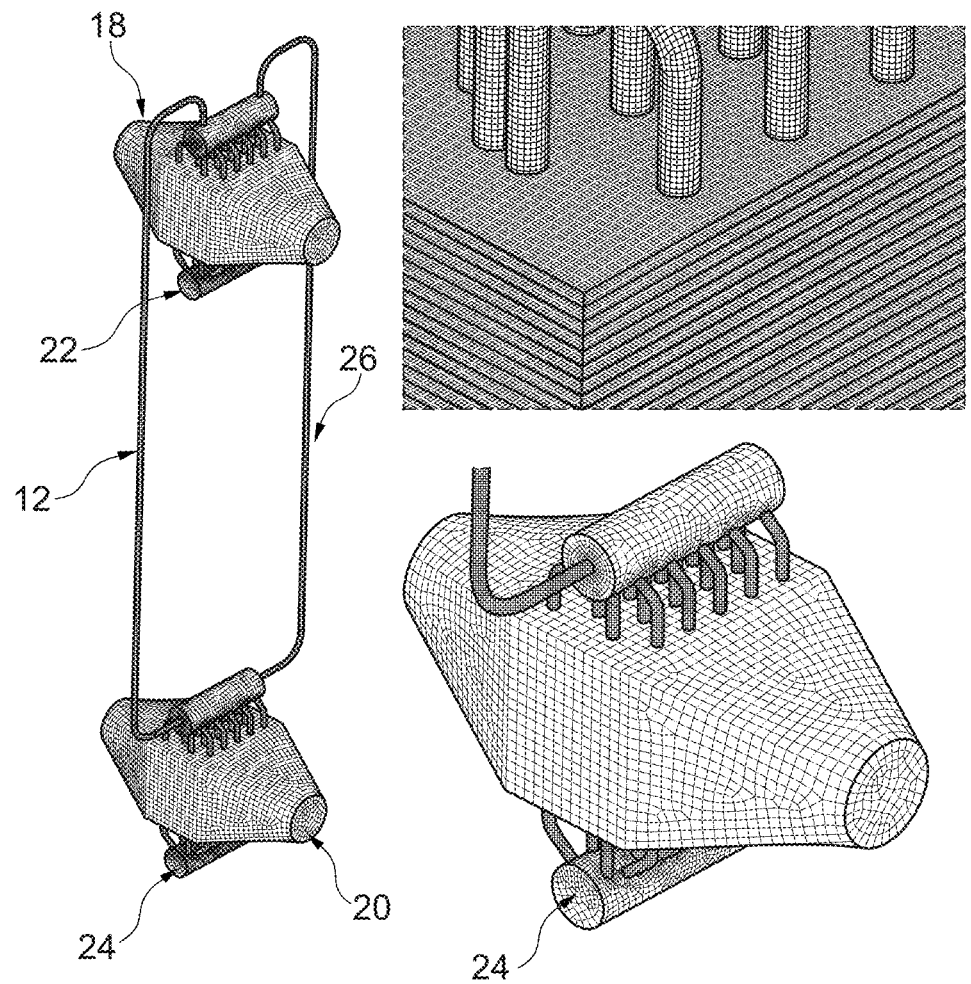
FIG. 23 is a schematic diagram of a heat pipe system with a mesh as described herein.

The developed mesh is shown in FIG. 23. The developed mesh was constructed from a structured hexahedral mesh which has been applied throughout the geometry. The application of the mesh throughout the geometry. The addition of near wall meshing allows the appropriate visualization of any near wall effects commonly experienced with bluff body shapes.

The selection of boundary conditions reflects the operation of a counter flow heat pipe heat exchanger. The existing literature modelling isolated cross flow systems commonly uses a velocity inlet and pressure outlet coupling. The coupling ensures the definition of the incoming flow properties such as velocity, pressure and temperature. The combination of a velocity inlet with a pressure outlet allows the definition of scalar values but with the added stability when back flow occurs.

The selected turbulence model plays a significant role to effectively model the turbulence and flow visualization around the heat pipe unit. The selection for the crossflow unit was modelled using the realizable k-epsilon model. To ensure the optimum accuracy level from the selected turbulence model a second order discretization method and a SIMPLE algorithm.

Before the simulations can be begin, the following assumptions were applied

1. The adiabatic sections were set as a zero-heat flux condition
2. Heat pipes were modelled as superconductors with a set thermal conductivity
3. Constant Velocity was applied in condenser and evaporator sections
4. Constant inlet temperature was applied in the condenser and evaporator.
5. Walls enclosing the heat pipe system were set as a zero-heat flux The validation of the system was conducted using CFD via ANSYS Fluent. The utilization of Fluent validates the operation of the unit.

TABLE 3

| Evaporator | | Condenser | |
|---|---|---|---|
| Inlet Conditions | Value | Inlet Conditions | Value |
| Velocity | 3.7545 m/s | Velocity | 3.7545 m/s |
| Temperature | 37° C. | Temperature | 15° C. |

The POC simulation acts as a baseline study in conjunction with the reflected experimental study. Table 3 reflects the operation condition utilized in the simulation, the simulation assumes that these values are constant therefore minor differences between the experimental and CFD values are expected.

Figure 24:
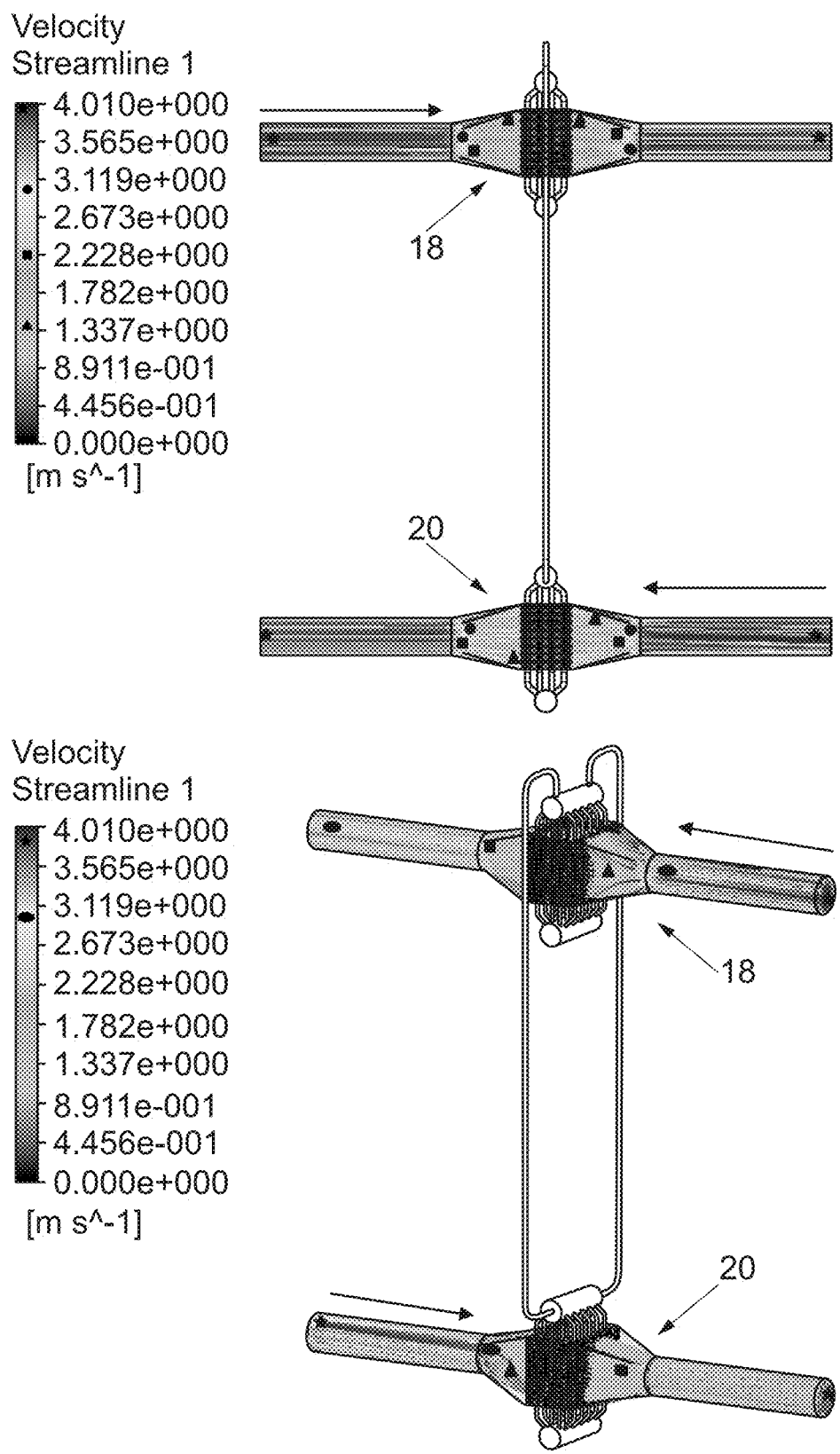
FIG. 24 is a velocity plot of a heat pipe system as described herein.

FIG. 24 illustrates the associated velocity path lines during the system operation. Unlike the presented design renders, the CFD model contains an entry length to assume a fully developed flow. The CFD results reflected highlight an overall uniform flow with minimal areas of wake, the expansion piece designed by Brunel University London, has been designed to minimize the presence of wakes. The lack of wakes means that areas of stagnation (i.e. poor heat transfer areas) are minimal and thus improving the flow distribution around the heat pipes. Similarly, the addition of fins improves the thermal effective area, without blocking the flow regime.

Figure 25:
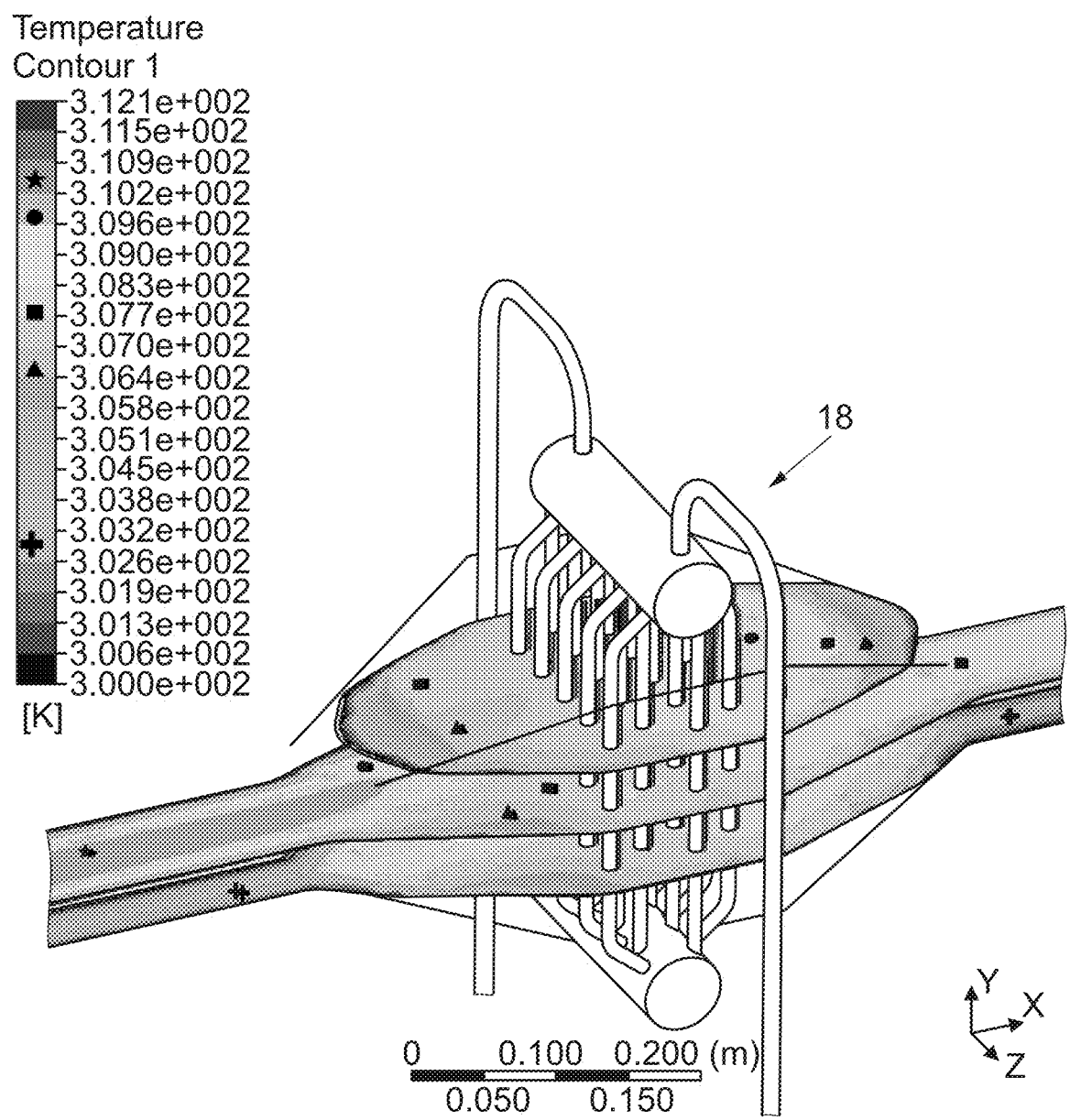
FIG. 25 is a detailed view of a temperature plot of a heat pipe system as described herein.
Figure 26:
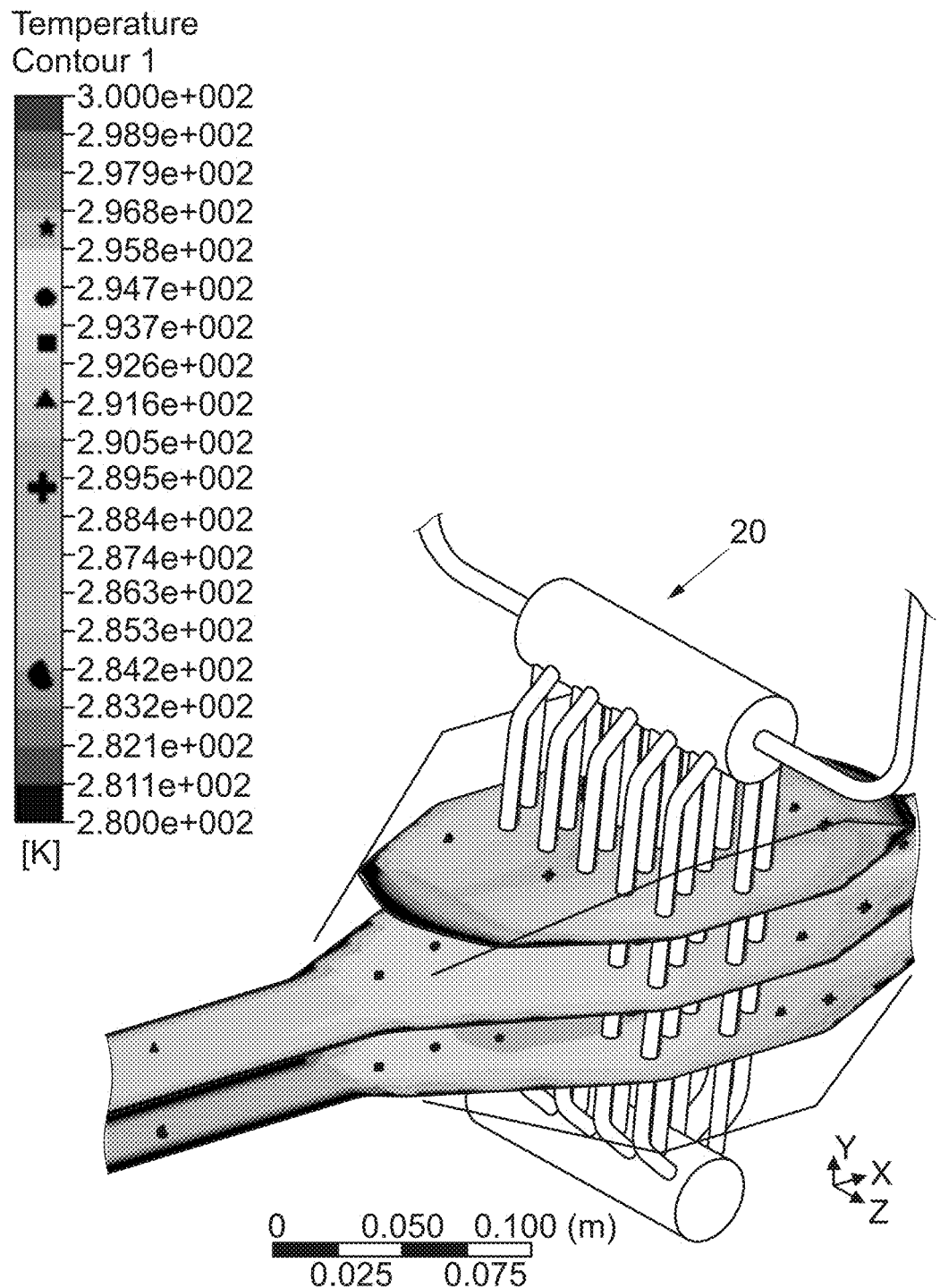
FIG. 26 is a detailed view of a temperature plot of a heat pipe system as described herein.
Figure 27:
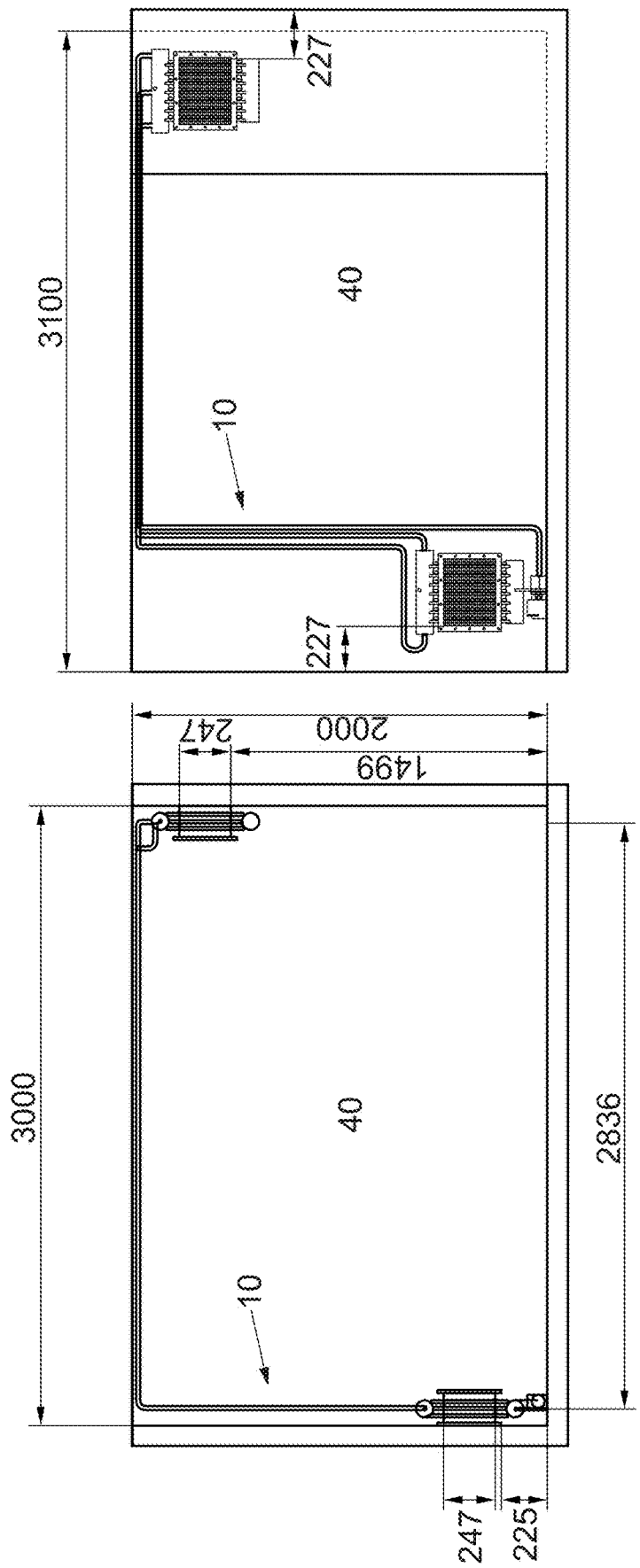
FIG. 27 is a view in side and front elevation of a heat pipe system installed in a room with dimensions shown.
Figure 28:
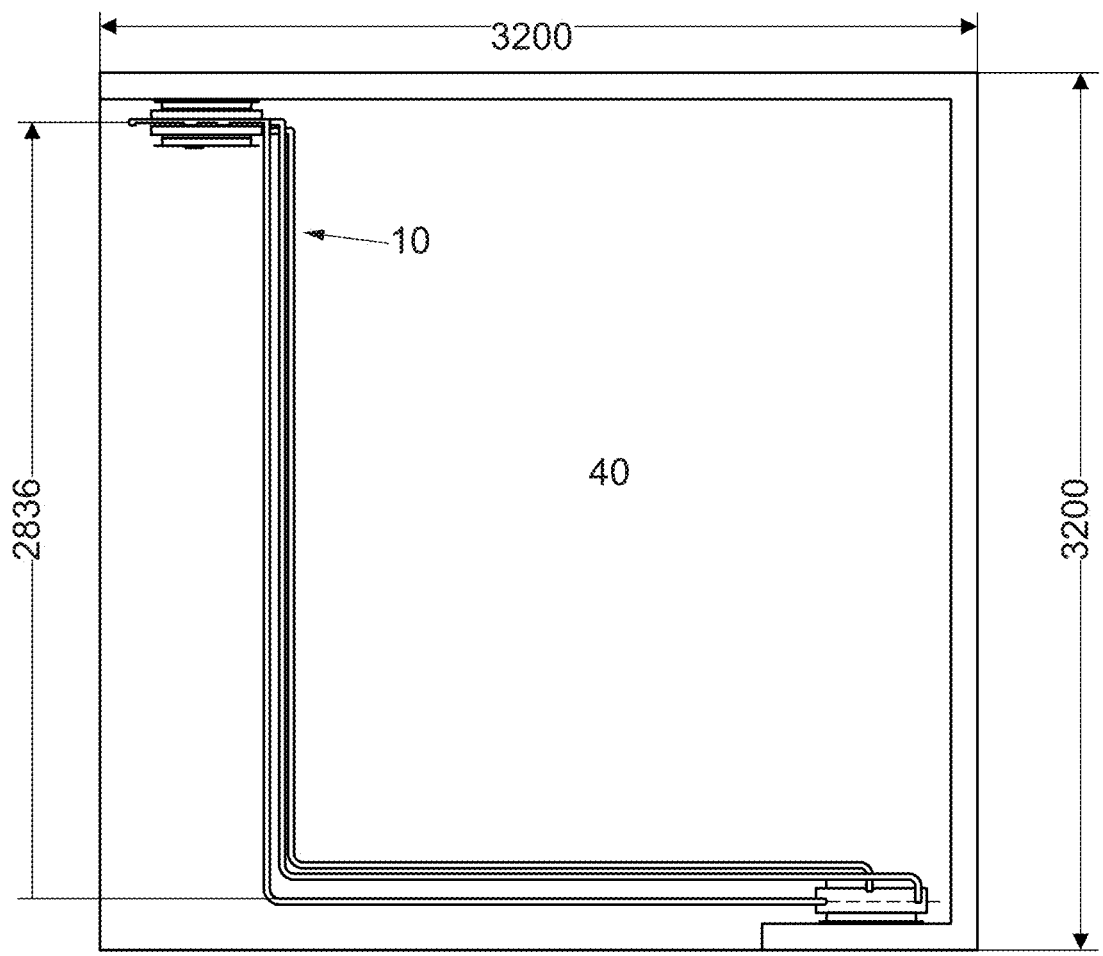
FIG. 28 is a view in side elevation of a heat pipe system installed in a room with dimensions shown.
Figure 29:
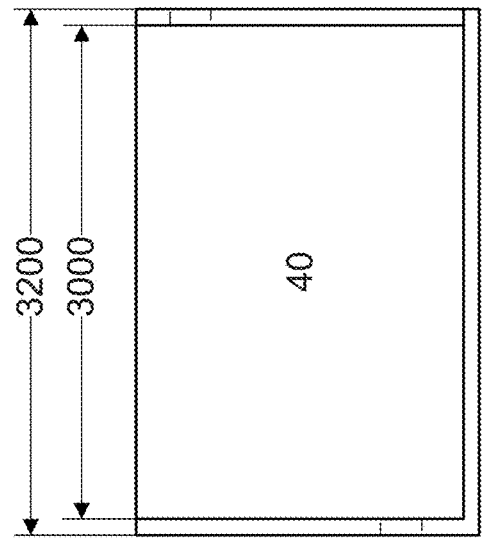
FIG. 29 is a view in top, back and side elevation of a heat pipe system installed in a room with dimensions shown.
Figure 29:
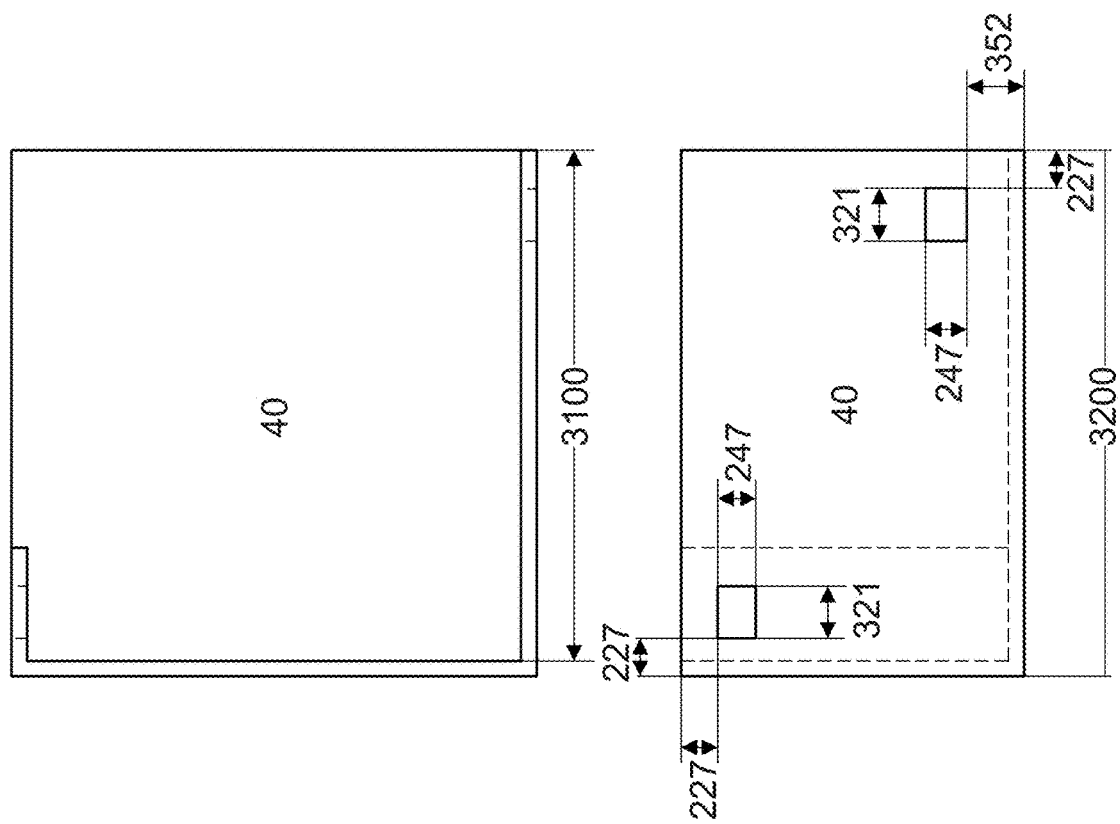
Figure 30:
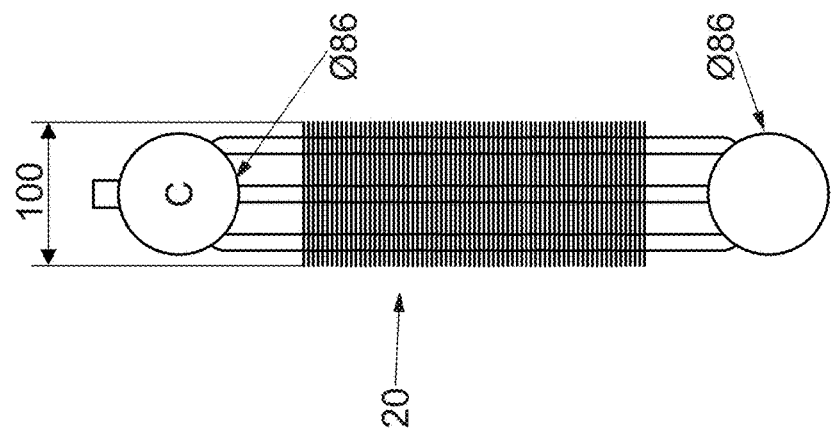
FIG. 30 is a view in top, front and side elevation of a heat exchanger with dimensions shown.
Figure 30:
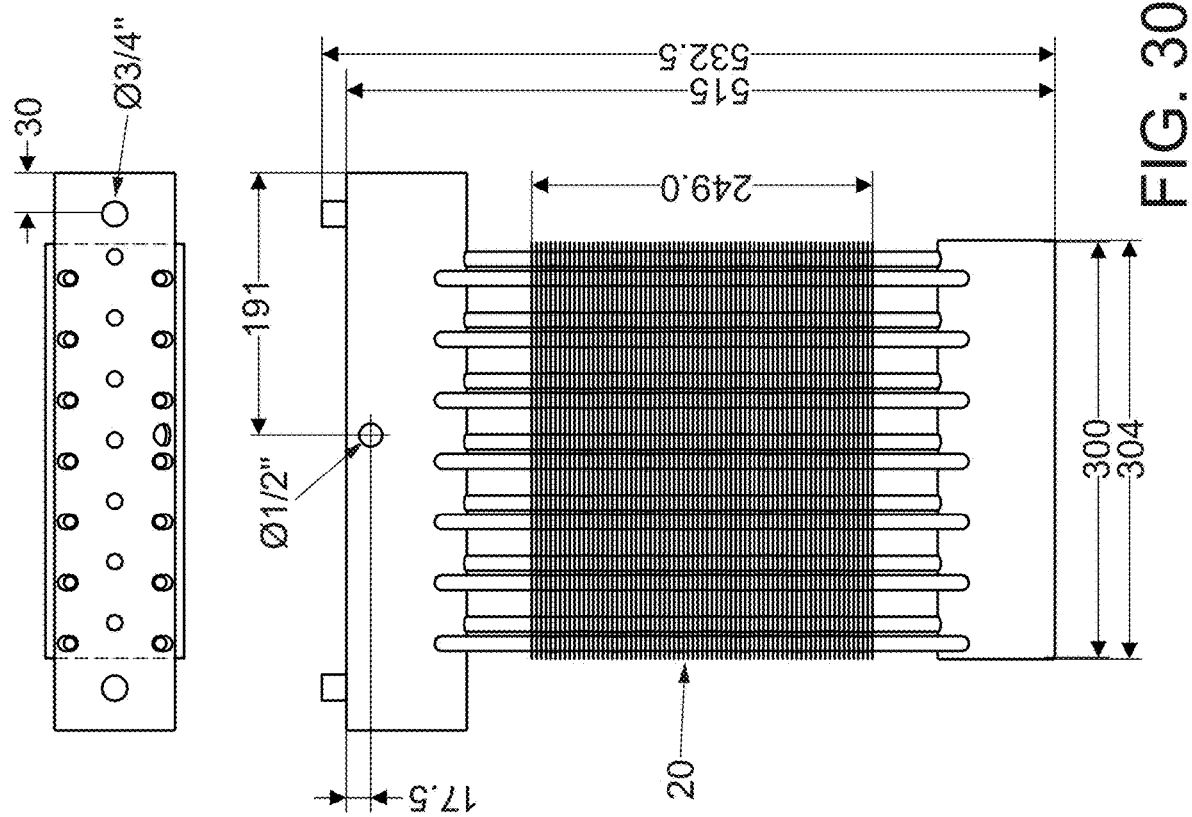
Figure 31:
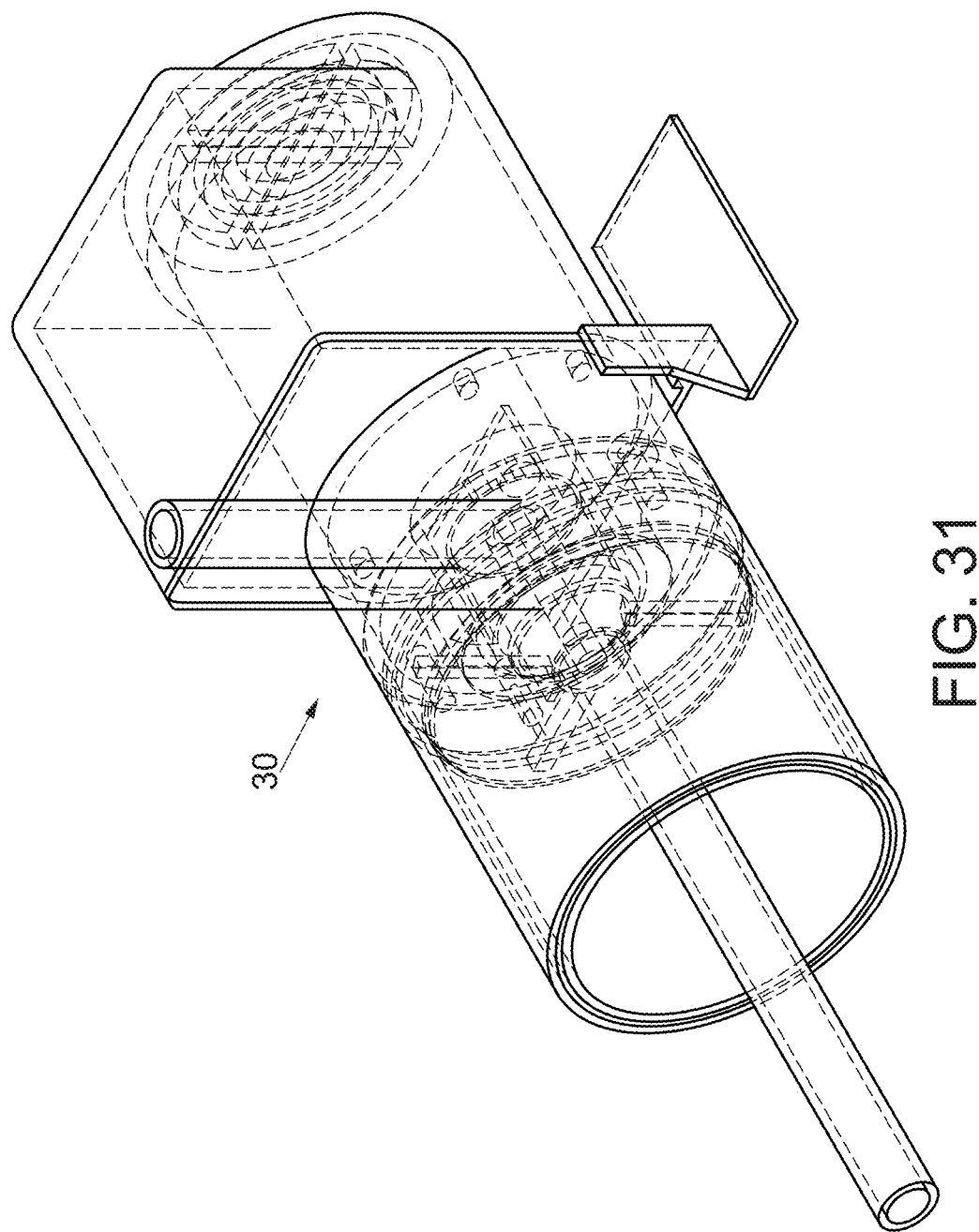
FIG. 31 is a schematic diagram of a heat pipe pump as described herein.
Figure 32:
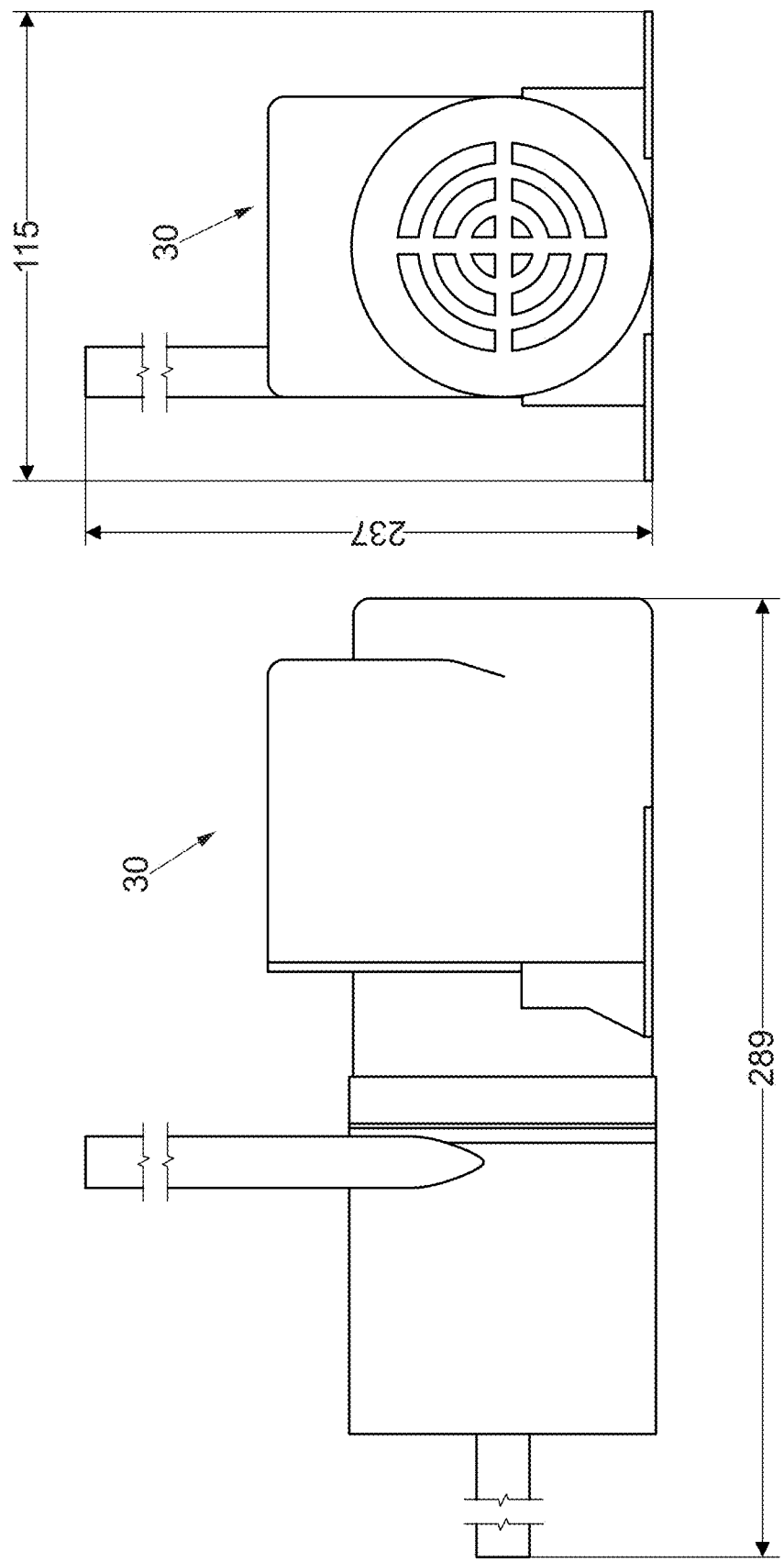
FIG. 32 is a schematic diagram in side and front elevation of a heat pipe pump with dimensions shown.

FIGS. 25 and 26 show temperature contour plots and illustrate the superior performance of the transitional piece, with minimal variations throughout the entrance of the duct. FIG. 25 illustrates a temperature plot, and, for the sake of a clear visualization, planar views of the fins have been omitted for a clear visualization of temperature visualization around the heat pipes. The CFD visualization of heat pipe heat exchangers have been extensively modelled, and commonly a level of temperature variation exists with single pass systems. The addition of fins with the heat pipe has eradicated major fluctuations due to the significantly increased heat transfer area. Table 4 reflects the values obtained for both inlet and outlet conditions for the temperature plot shown in FIG. 25.

TABLE 4

| Boundary Condition | Fluent Export Temperature (° C.) |
|---|---|
| Inlet | 38° C. |
| Outlet | 33.5° C. |

The operation of the bottom heat exchanger 20 functioning with an incoming atmospheric cold stream is shown in FIG. 26. The operation is similar to the top heat exchanger 18 profile in the terms of a distributed temperature profile across planar section of the hear pipe. The effect of fins is evident due the uniform velocity profile and associated uniform temperature distribution in FIG. 24 and FIG. 25 respectively. Table 5 reflects the values obtained for both inlet and outlet conditions for the temperature plot shown in FIG. 26.

TABLE 5

| Boundary Condition | Fluent Export Temperature (° C.) |
|---|---|
| Inlet | 14.8° C. |
| Outlet | 23.75° C. |

FIGS. 27 to 32 show manufacturing drawings of the heat pipe system installed in a room, of the heat exchanger and the heat pump with some example dimensions shown. The dimensions shown are in millimeters, except for two of the hole diameter dimensions in FIG. 30 which are shown in inches.

From both numerical and experimental results, the reflected observations prove the functionality of the system. The operation of the heat pipe unit reflects a successful prototype with the future developments including the installation and testing of a full-scale ventilation unit.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

The disclosures in United Kingdom patent application 1809208.0, from which this application claims priority, and in the abstract accompanying this application are incorporated herein by reference.

What is claimed is:

1. A heat pipe system including:
   a heat pipe loop having a first end and a second end, and comprising first and second arms for transferring working fluid from said first end to said second end;
   a first reservoir in fluid communication with said first end for holding working fluid in liquid form;
   a first heat exchanger at said first end for transmitting thermal energy from a heat source to working fluid from said first reservoir in order to vaporize said fluid;
   a second heat exchanger at said second end for transmitting thermal energy from vaporized working fluid to a heat sink thereby condensing said fluid;
   a second reservoir in fluid communication with said second end for holding condensed working fluid in liquid form before said fluid is returned to said first end of said heat pipe loop;
   a return conduit for returning condensed working fluid from said second reservoir at said second end to said first reservoir at said first end, said return conduit thereby forming a priming loop which is separate from said heat pipe loop; and
   a pump for pumping said condensed working fluid from said second end to said first end along said return conduit;
   wherein said heat pipe loop, said return conduit, said first reservoir, and said second reservoir form a hermetically sealed circuit, and
   wherein said pump is located inside said sealed circuit and is configured to be driven from outside said sealed circuit.

2. The heat pipe system of claim 1, wherein said pump is driven by a motor located outside said sealed circuit and said pump is magnetically coupled to said motor.

3. The heat pipe system of claim 2, wherein said heat pipe loop does not have a wick.

4. The heat pipe system of claim 2, wherein said pump is configured to operate intermittently.

5. The heat pipe system of claim 2, wherein said first end of said heat pipe loop is higher than said second end of said heat pipe.

6. The heat pipe system of claim 1, wherein said heat pipe loop does not have a wick.

7. The heat pipe system of claim 1, wherein said pump is configured to operate intermittently.

8. The heat pipe system of claim 1, wherein said first end of said heat pipe loop is higher than said second end of said heat pipe loop.

9. A method of transferring thermal energy using a heat pipe system of claim 1 and including the steps of:
   thermally contacting said first heat exchanger to a said heat source in order that said first heat exchanger transmits thermal energy to a said working fluid from said first reservoir, thereby vaporizing said working fluid;
   transferring said vaporized working fluid along said heat pipe loop from said first end to said second end;
   condensing said vaporized working fluid in order that thermal energy is transmitted from said working fluid via said second heat exchanger to said heat sink; and
   driving said pump located inside said sealed circuit from outside said sealed circuit in order to return said condensed working fluid from said second end to said first end by pumping the condensed working fluid along said return conduit.

10. The method of claim 9 including driving said pump from a magnetically coupled motor located outside said sealed circuit.

* * * * *